(12) United States Patent
Ramani et al.

(10) Patent No.: US 12,266,273 B2
(45) Date of Patent: Apr. 1, 2025

(54) AUGMENTED REALITY PLATFORM FOR COLLABORATIVE CLASSROOMS

(71) Applicant: Purdue Research Foundation, West Lafayette, IN (US)

(72) Inventors: Karthik Ramani, West Lafayette, IN (US); Ana Villanueva Pérez, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/049,065

(22) Filed: Oct. 24, 2022

(65) Prior Publication Data

US 2023/0062951 A1 Mar. 2, 2023

Related U.S. Application Data

(63) Continuation of application No. 16/698,347, filed on Nov. 27, 2019, now Pat. No. 11,501,658.

(60) Provisional application No. 62/927,683, filed on Oct. 30, 2019, provisional application No. 62/772,416, filed on Nov. 28, 2018.

(51) Int. Cl.
*G09B 19/00* (2006.01)
*G06T 11/00* (2006.01)
*G09B 7/00* (2006.01)
*H04L 67/131* (2022.01)

(52) U.S. Cl.
CPC ............ *G09B 19/003* (2013.01); *G06T 11/00* (2013.01); *G09B 7/00* (2013.01); *H04L 67/131* (2022.05)

(58) Field of Classification Search
CPC .......... G09B 5/02; G09B 19/003; G09B 7/00; G09B 5/14; G09B 5/125; G06T 19/006; G06T 11/00; G06T 2219/004; G06T 2219/024; H04L 67/131; H04L 65/75; G06Q 10/20; G06F 3/1454; G06F 40/169; G06V 20/20
See application file for complete search history.

(56) References Cited

U.S. PATENT DOCUMENTS

| | | | |
|---|---|---|---|
| 8,914,472 B1 * | 12/2014 | Lee | G06Q 30/04 709/219 |
| 8,918,819 B1 * | 12/2014 | Peters | H04N 21/25875 725/139 |
| 9,329,469 B2 * | 5/2016 | Benko | G02B 27/017 |

(Continued)

OTHER PUBLICATIONS

Abraham, Magrid and M Annunziata, Augmented Reality is Already Improving Worker Performance, Harvard Business Review, 2017.
(Continued)

*Primary Examiner* — Jin Cheng Wang
(74) *Attorney, Agent, or Firm* — Maginot, Moore & Beck LLP

(57) ABSTRACT

An augmented reality system for developing and providing augmented reality learning experiences is disclosed. The augmented reality system advantageously combines augmented reality with the capabilities of cloud technology to provide a pull-based collaborative model, in which students and instructors collaborate by uploading, sharing, and downloading augmented reality learning content. The augmented reality system enables students to improve the augmented reality learning content by adding contributions to the original augmented reality learning content that was created by an instructor.

19 Claims, 10 Drawing Sheets

(56) References Cited

U.S. PATENT DOCUMENTS

| | | | | |
|---|---|---|---|---|
| 10,366,521 | B1* | 7/2019 | Peacock | G02B 27/017 |
| 11,200,811 | B2* | 12/2021 | Kwatra | G09B 19/24 |
| 2014/0207874 | A1* | 7/2014 | Soorianarayanan | G01N 29/00 709/204 |
| 2014/0310595 | A1* | 10/2014 | Acharya | G06F 3/011 715/706 |
| 2016/0049082 | A1* | 2/2016 | Leatherman, III | H04M 7/0027 434/408 |
| 2016/0291922 | A1* | 10/2016 | Montgomerie | G09B 5/125 |
| 2016/0292925 | A1* | 10/2016 | Montgomerie | H04L 65/75 |
| 2016/0328887 | A1* | 11/2016 | Elvezio | G06F 3/04815 |
| 2016/0358383 | A1* | 12/2016 | Gauglitz | G06F 3/0304 |
| 2018/0324229 | A1* | 11/2018 | Ross | G06F 3/1423 |
| 2019/0130777 | A1* | 5/2019 | Dey | G09B 5/12 |
| 2019/0259206 | A1* | 8/2019 | Martin | G06T 19/006 |
| 2019/0260966 | A1* | 8/2019 | Leatherman, III | H04L 12/1822 |
| 2019/0347061 | A1* | 11/2019 | Morris | G06F 3/1431 |
| 2019/0354334 | A1* | 11/2019 | Billinghurst | G06F 3/013 |
| 2020/0043354 | A1* | 2/2020 | Ha | G06F 3/0304 |
| 2020/0066049 | A1* | 2/2020 | Sun | G06Q 10/10 |
| 2020/0211292 | A1* | 7/2020 | Wu | G06T 19/006 |
| 2020/0273254 | A1* | 8/2020 | Bennett | G06F 3/04845 |
| 2020/0394012 | A1* | 12/2020 | Wright, Jr. | G06F 18/22 |
| 2021/0126956 | A1* | 4/2021 | Huang | H04L 65/4015 |
| 2023/0196223 | A1* | 6/2023 | Hoffmeister | H04W 4/02 705/7.13 |

OTHER PUBLICATIONS

Ackerman, Mark S., et al., Sharing expertise: Beyond knowledge management, MIT press, 2003.

Agrawala, Maneesh et al., Designing effective step-by-step assembly instructions, In ACM Transactions on Graphics (TOG), ACM, 2003, pp. 828-837, vol. 22.

Atkinson, Robert K., Optimizing Learning From Examples Using Animated Pedagogical Agents, Journal of Educational Psychology, 2002, 416, 94, 2.

Atkinson, Robert K. et al., Learning From Examples: Instructional Principles From the Worked Examples Research, Review of Educational Research, 2000, pp. 181-214, 70, 2.

Cañas, José J. et al., The Role of Working Memory on Measuring Mental Models of Physical Systems, Psicológica, 2001, 22.

Catrambone, Richard, The Subgoal Learning Model: Creating Better Examples so That Students Can Solve Novel Problems, Journal of Experimental Psychology: General, 1998, 127, 4, 355.

Desmarais, Michel C. and Ryan S Baker, A Review of Recent Advances in Learner and Skill Modeling in Intelligent Learning Environments, User Modeling and User-Adapted Interaction, 22, 1-2, 2012, 9-38.

Duan, Feng et al., An Assembly Skill Transferring Method for Cellular Manufacturing System—Part I: Verification of the Proposed Method for Motor Skill, IEEE Transactions on Automation Science and Engineering, 2013, pp. 465-470.

Duan, Feng et al., Application of the Assembly Skill Transfer System in an Actual Cellular Manufacturing System, IEEE Transactions on Automation Science and Engineering, 2012, pp. 31-41, 9.

Duan, Feng et al., Verification of the Elect of an Assembly Skill Transfer Method on Cognition Skills, IEEE Transactions on Cognitive and Developmental Systems, 2016, pp. 73-83.

Eiriksdottir, Elsa and Richard Catrambone, Procedural Instructions, Principles, and Examples: How to Structure Instructions for Procedural Tasks to Enhance Performance, Learning, and Transfer, Human Factors, 2011, pp. 749-770.

Ellis, Timothy, Animating to Build Higher Cognitive Understanding: A Model for Studying Multimedia Electiveness in Education, Journal of Engineering Education, 2004, pp. 59-64, 93, 1.

Fairlie, Robert W. et al., Disparities in Capital Access Between Minority and Non-Minority-Owned Businesses, US Dept. of Commerce, 2010.

Farkas, David K., The Logical and Rhetorical Construction of Procedural Discourse, Technical Communication, 1999, 42, 46, 1.

Fu, Wai-Tat and Wayne D Gray, Suboptimal tradeoffs in information seeking, Cognitive Psychology, 2006, pp. 195-242, 52, 3.

Funk, Markus et al., A benchmark for interactive augmented reality instructions for assembly tasks, In Proceedings of the 14th International Conference on Mobile and Ubiquitous Multimedia, ACM, 2015, pp. 253-257.

Ganier, Franck, Factors affecting the processing of procedural instructions: implications for document design, IEEE Transactions on Professional Communication, 2004, pp. 15-26, 47, 1.

Gavish, Nirit et al., Evaluating virtual reality and augmented reality training for industrial maintenance and assembly tasks, Interactive Learning Environments, 2015, pp. 778-798, 23, 6.

Gorecky, Dominic, COGNITO: a cognitive assistance and training system for manual tasks in industry, In ECCE, 2011, pp. 53-56.

Gray, Wayne D. et al., The soft constraints hypothesis: a rational analysis approach to resource allocation for interactive behavior, Psychological review, 2006, 113, 3, 461.

Henderson, Steven and Steven Feiner, Exploring the benefits of augmented reality documentation for maintenance and repair, IEEE transactions on visualization and computer graphics, 2011, pp. 1355-1368, 17, 10.

Hořejší, Petr, Augmented reality system for virtual training of parts assembly, Procedia Engineering, 2015, pp. 699-706, 100.

Karreman, Joyce et al., Procedural and declarative information in user instructions: What we do and don't know about these information types, In Professional Communication Conference, 2005, IPCC 2005 Proceedings International, IEEE, pp. 328-333.

Knörig, André et al., Fritzing: a tool for advancing electronic prototyping for designers. In Proceedings of the 3rd International Conference on Tangible and Embedded Interaction, ACM, 2009, pp. 351-358.

Kobayashi, Leo et al., Exploratory Application of Augmented Reality/Mixed Reality Devices for Acute Care Procedure Training, Western Journal of Emergency Medicine, 2018, pp. 158-164, 19, 1.

Koedinger, Kenneth R. et al., The Knowledge-Learning-Instruction framework: Bridging the science-practice chasm to enhance robust student learning, Cognitive science, 2012, pp. 757-798, 36, 5.

Kolb, Alice Y. and David A Kolb, Learning styles and learning spaces: Enhancing experiential learning in higher education, Academy of management learning & education, 2005, pp. 193-212, 4, 2.

Mao, Chia-Chi et al., Impact of an augmented reality system on learning for army military decision-making process (MDMP) course, In Advances in Ergonomics Modeling, Usability & Special Populations. Springer, 2017, pp. 663-671.

Mayer, Richard E. and Roxana Moreno, Nine ways to reduce cognitive load in multimedia learning, Educational psychologist, 2003, pp. 43-52, 38, 1.

Novick, Laura R. and Douglas L Morse, Folding a fish, making a mushroom: The role of diagrams in executing assembly procedures, Memory & Cognition, 2000, pp. 1242-1256, 28, 7.

Oladokun, V.O. et al., Predicting students' academic performance using artificial neural network: A case study of an engineering course, The Pacific Journal of Science and Technology, 2008, pp. 72-79, 9, 1.

Pastor, Peter et al., Learning and generalization of motor skills by learning from demonstration, In Robotics and Automation, ICRA'09, IEEE International Conference, IEEE, 2009, pp. 763-768.

Pavlik Jr, Philip I. et al., Learning Factors Transfer Analysis: Using Learning Curve Analysis to Automatically Generate Domain Models, 2009.

Radkowski, Rafael et al., Guiding or Exploring: Finding the Right Way to Teach Students Structural Analysis with Augmented Reality, In International Conference on Virtual, Augmented and Mixed Reality, Springer, 2018, pp. 452-461.

Re, Guido Maria and Monica Bordegoni, An augmented reality framework for supporting and monitoring operators during maintenance tasks, In International Conference on Virtual, Augmented and Mixed Reality, Springer, 2014, pp. 443-454.

Sentz, Justin A., Instructional Designer Awareness and Application of Strategies to Manage Cognitive Load, 2018.

(56) References Cited

OTHER PUBLICATIONS

Simón, Victor et al., The development of an advanced maintenance training programme utilizing augmented reality, In International Congress on Condition Monitoring and Diagnostic Engineering Management: Implications of life cycle analysis in asset and maintenance, 2014, Sep. 16, 2014-Sep. 18, 2014.

Smaldino, Sharon E. et al., Instructional technology and media for learning, 2008.

Steehouder, Michaël et al., Making sense of step-by-step procedures, In Proceedings of IEEE professional communication society international professional communication conference and Proceedings of the 18th annual ACM international conference on Computer documentation: technology & teamwork. IEEE Educational Activities Department, 2000, pp. 463-475.

Taatgen, Niels A. et al., The acquisition of robust and flexible cognitive skills. Journal of Experimental Psychology: General, 2008, pp. 548-565, 137, 3.

Wang, Xin et al., A comprehensive survey of augmented reality assembly research, Advances in Manufacturing, 2016, pp. 1-22, 4, 1.

Webel, Sabine et al., Design recommendations for augmented reality based training of maintenance skills, In Recent trends of mobile collaborative augmented reality systems, Springer, 2011, pp. 69-82.

Webel, Sabine et al., Design criteria for AR-based training of maintenance and assembly tasks. In International Conference on Virtual and Mixed Reality. Springer, 2011, pp. 123-132.

Westerfield, Giles et al., Intelligent augmented reality training for motherboard assembly. International Journal of Artificial Intelligence in Education, 2015, pp. 157-172, 25, 1.

Wu, Po-Han et al., Impacts of integrating the repertory grid into an augmented reality-based learning design on students' learning achievements, cognitive load and degree of satisfaction. Interactive Learning Environments, 2018, pp. 221-234, 26, 2.

Xie, Heping et al., The more total cognitive load is reduced by cues, the better retention and transfer of multimedia learning: A meta-analysis and two metaregression analyses, PloS one, 2017, 12, 8.

Yeo, Darren J. and Lisa K Fazio, The optimal learning strategy depends on learning goals and processes: Retrieval practice versus worked examples. Journal of Educational Psychology, 2018.

Akçayr, Murat and Gökçe Akçayir, Advantages and challenges associated with augmented reality for education: A systematic review of the literature. Educational Research Review, 2017, pp. 1-11.

Beheshti, Elham et al., Looking inside the wires: Understanding museum visitor learning with an augmented circuit exhibit. In Proceedings of the 2017 chi conference on human factors in computing systems. ACM, 2017, pp. 1583-1594.

Gongjun Xu and Stephanie Zhang. Identifiability of diagnostic classification models. Psychometrika 81, 3 (2016), 625-649.

Susan A Yoon, et al. Using augmented reality and knowledge-building scaffolds to improve learning in a science museum. International Journal of Computer-Supported Collaborative Learning 7, 4 (2012), 519-541.

Bhaskar Bhattacharya. Automatic generation of augmented reality guided assembly instructions using expert demonstration. (2016).

Bhaskar Bhattacharya and Eliot Winer. A method for real-time generation of augmented reality work instructions via expert movements. In The Engineering Reality of Virtual Reality 2015, vol. 9392. International Society for Optics and Photonics, 93920G.

Han Kyu Yoo and Jong Weon Lee. 2014. Mobile augmented reality system for in-situ 3D modeling and authoring. In 2014 International Conference on Big Data and Smart Computing (BIGCOMP). IEEE, 282-285.

Jinhyuk Choi, et al. k-MART: Authoring tool for mixed reality contents. In 2010 IEEE International Symposium on Mixed and Augmented Reality. IEEE, 2010, 219-220.

S Coquillart, M Göbel, et al. Authoring of mixed reality applications including multi-marker calibration for mobile devices. In Eurographics Symposium on Virtual Environments, 2004, 1-9.

J Zhu, SK Ong, and AYC Nee. An authorable context-aware augmented reality system to assist the maintenance technicians. The International Journal of Advanced Manufacturing Technology 66, 9-12, 2013, 1699-1714.

Mesut Duran, et al. Urban high school students' IT/STEM learning: Findings from a collaborative inquiry-and design-based afterschool program. Journal of Science Education and Technology, 23, 1, 2014, 116-137.

Daniel Eckhoff, et al. 2018. TutAR: augmented reality tutorials for hands-only procedures. In Proceedings of the 16th ACM SIGGRAPH International Conference on Virtual-Reality Continuum and its Applications in Industry. ACM, 8.

Hesham El-Rewini and Mostafa Abd-El-Barr. 2005. Advanced computer architecture and parallel processing. vol. 42. John Wiley & Sons.

Barrett Ens, et al. 2017. Ivy: Exploring spatially situated visual programming for authoring and understanding intelligent environments. In Proceedings of the 43rd Graphics Interface Conference. Canadian Human-Computer Communications Society, 156-162.

Georgios Gousios, Margaret-Anne Storey, and Alberto Bacchelli. Work practices and challenges in pull-based development: the contributor's perspective. In Software Engineering (ICSE), 2016 IEEE/ACM 38th International Conference on. IEEE, 285-296.

Georgios Gousios, et al. 2015. Work practices and challenges in pull-based development: the integrator's perspective. In Proceedings of the 37th International Conference on Software Engineering—vol. 1. IEEE Press, 358-368.

Paul Grimm, et al. 2002. AMIRE-authoring mixed reality. In Augmented Reality Toolkit, The First IEEE International Workshop. IEEE, 2-pp.

Sinem Guven, Steven Feiner, and Ohan Oda. 2006. Mobile augmented reality interaction techniques for authoring situated media on-site. In 2006 IEEE/ACM International Symposium on Mixed and Augmented Reality. IEEE, 235-236.

Eric Klopfer and Kurt Squire. Environmental Detectives the development of an augmented reality platform for environmental simulations. Educational technology research and development 56, 2 (2008), 203-228.

Tobias Langlotz, et al. 2012. AR record & replay: situated compositing of video content in mobile augmented reality. In Proceedings of the 24th Australian Computer-Human Interaction Conference. ACM, 318-326.

Gun A Lee, Gerard J Kim, and Mark Billinghurst. Immersive authoring: What you experience is what you get (wyxiwyg). Commun. ACM 48, 7 (2005), 76-81.

Gun A Lee, et al. 2004. Immersive authoring of tangible augmented reality applications. In Proceedings of the 3rd IEEE/ACM international Symposium on Mixed and Augmented Reality. IEEE Computer Society, 172-181.

Yao Lu, et al. 2017. Using Pull-Based Collaborative Development Model in Software Engineering Courses: A Case Study. In International Conference on Database Systems for Advanced Applications. Springer, 399-410.

Blair MacIntyre, et al. 2004. DART: a toolkit for rapid design exploration of augmented reality experiences. In Proceedings of the 17th annual ACM symposium on User interface software and technology. ACM, 197-206.

Richard E Mayer and Roxana Moreno. Nine ways to reduce cognitive load in multimedia learning. Educational psychologist 38, 1 (2003), 43-52.

Maged Michael, et al. 2007. Scale-up x scale-out: A case study using nutch/lucene. In 2007 IEEE International Parallel and Distributed Processing Symposium. IEEE, 1-8.

Katharina Mura, et al. IBES: a tool for creating instructions based on event segmentation. Frontiers in psychology 4 (2013), 994.

Jong-Seung Park. AR-Room: a rapid prototyping framework for augmented reality applications. Multimedia tools and applications 55, 3 (2011), 725-746.

Nils Petersen and Didier Stricker. Learning task structure from video examples for workflow tracking and authoring. In Mixed and Augmented Reality (ISMAR), 2012 IEEE International Symposium on. IEEE, 237-246.

(56) References Cited

OTHER PUBLICATIONS

Yue Yu, et al, Wait for it: determinants of pull request evaluation latency on GitHub. In 2015 IEEE/ACM 12th Working Conference on Mining Software Repositories. IEEE, 2015, 367-371.

J Zhu, Soh-Khim Ong, and Andrew YC Nee. A context-aware augmented reality assisted maintenance system. International Journal of Computer Integrated Manufacturing, 28, 2, 2015, 213-225.

Dieter Schmalstieg, et al. The studierstube augmented reality project. Presence: Teleoperators & Virtual Environments 11, 1 (2002), 33-54.

Hartmut Seichter, Julian Looser, and Mark Billinghurst, 2008. ComposAR: An intuitive tool for authoring AR applications. In Proceedings of the 7th IEEE/ACM international symposium on mixed and augmented reality. IEEE Computer Society, 177-178.

Jeongmin Yu, et al. 2016. A Unified Framework for Remote Collaboration Using Interactive AR Authoring and Hands Tracking. In International Conference on Distributed, Ambient, and Pervasive Interactions. Springer, 132-141.

Rob Von Behren, et al. 2003. Capriccio: scalable threads for internet services. In ACM SIGOPS Operating Systems Review, vol. 37. ACM, 268-281.

Jayzon F Ty, Ma Mercedes T Rodrigo, and Marc Ericson C Santos. A Mobile Authoring Tool for AR Content Generation Using Images as Annotations. Philippine Information Technology Journal 7, 1 (2014), 61-70.

Wilson, Margaret, Six views of embodied cognition. Psychonomic bulletin & review 9, 4 (2002), 625-636.

Hsin-Kai Wu, Joseph S Krajcik, and Elliot Soloway. Promoting understanding of chemical representations: Students' use of a visualization tool in the classroom. Journal of Research in Science Teaching: The Official Journal of the National Association for Research in Science Teaching 38, 7 (2001), 821-842.

Blair, Erik, A reflexive exploration of two qualitative data coding techniques. Journal of Methods and Measurement in the Social Sciences, 2015, pp. 14-29, 6, 1.

Bower, Matt et al., Augmented Reality in education—cases, places and potentials. Educational Media International, 2014, pp. 1-15.

Buck, Gary and Kikumi Tatsuoka, Application of the rule-space procedure to language testing: Examining attributes of a free response listening test. Language testing, 1998, pp. 119-157.

Cai, Su Cai, Xu Wang, and Feng-Kuang Chiang, A case study of Augmented Reality simulation system application in a chemistry course. Computers in human behavior, 37, 2014, 31-40.

Cai, Yan, Dongbo Tu, and Shuliang Ding, Theorems and Methods of a Complete Q Matrix with Attribute Hierarchies under Restricted Q-Matrix Design, Frontiers in Psychology 9, 2018, 1413.

Chang, Hsin-Yi, Hsin-Kai Wu, and Ying-Shao Hsu, Integrating a mobile augmented reality activity to contextualize student learning of a socioscientific issue. British Journal of Educational Technology 44, 3, 2013, E95-E99.

Chen, Yunxiao, et al., Statistical analysis of Q-matrix based diagnostic classification models. J. Amer. Statist. Assoc. 110, 510, 2015, 850-866.

Chen, Yuh-Shyan, Tai-Chien Kao, and Jay-Ping Sheu, A mobile learning system for scaffolding bird watching learning. Journal of Computer Assisted Learning 19, 3, 2003, 347-359.

Cheng, Kun-Hung and Chin-Chung Tsai, Affordances of augmented reality in science learning: Suggestions for future research. Journal of science education and technology 22, 4, 2013, 449-462.

Gongjun Xu et al. Identifiability of restricted latent class models with binary responses. The Annals of Statistics 45, 2 (2017), 675-707.

Chiang, Tosti Hsu-Cheng, Stephen JH Yang, and Gwo-Jen Hwang, An augmented reality-based mobile learning system to improve students' learning achievements and motivations in natural science inquiry activities. Educational Technology & Society, 17, 4, 2014, 352-365.

Chiu, Chia-Yi, Jeffrey A Douglas, and Xiaodong Li, Cluster analysis for cognitive diagnosis: Theory and applications. Psychometrika 74, 4, 2009, 633.

Condado, Manuel, et al., Integrating Historical Content with Augmented Reality in an Open Environment. In International Conference on Human-Computer Interaction. Springer, 2019, 196-205.

Desmarais, M., Behzad Beheshti, and Rhouma Naceur. 2012. Item to skills mapping: deriving a conjunctive q-matrix from data. In International Conference on Intelligent Tutoring Systems. Springer, 454-463.

Dunleavy, Matt, Chris Dede, and Rebecca Mitchell. Affordances and limitations of immersive participatory augmented reality simulations for teaching and learning. Journal of science Education and Technology 18, 1 (2009), 7-22.

Ferrer-Torregrosa, et al., ARBOOK: Development and assessment of a tool based on augmented reality for anatomy. Journal of Science Education and Technology 24, 1 (2015), 119-124.

Fredette, Norman and John Lochhead. Student conceptions of simple circuits. The physics teacher 18, 3 (1980), 194-198.

Fugate, Jennifer MB, Sheila L Macrine, and Christina Cipriano. The role of embodied cognition for transforming learning. International Journal of School & Educational Psychology (2018), 1-15.

Haberman, Shelby J., Matthias von Davier, and Yi-Hsuan Lee. Comparison of multidimensional item response models: Multivariate normal ability distributions versus multivariate polytomous ability distributions. ETS Research Report Series 2008, 2 (2008), i-25.

Heller, Jürgen, Complete Q-Matrices in General Attribute Structure Models. (2019).

Hill, Janette R. and Michael J Hannafin. Teaching and learning in digital environments: The resurgence of resource-based learning. Educational Technology Research and Development 49, 3 (2001), 37-52.

Hsiao, Kuei-Fang, Nian-Shing Chen, and Shih-Yu Huang. Learning while exercising for science education in augmented reality among adolescents. Interactive learning environments 20, 4 (2012), 331-349.

Huisinga, Laura Anne, Augmented reality reading support in higher education: Exploring effects on perceived motivation and confidence in comprehension for struggling readers in higher education. (2017).

Iftene, Adrian and Diana Trandabăţ. Enhancing the Attractiveness of Learning through Augmented Reality. Procedia Computer Science 126 (2018), 166-175.

Kamarainen, Amy M., et al. EcoMOBILE: Integrating augmented reality and probeware with environmental education field trips. Computers & Education 68 (2013), 545-556.

Klopfer, E. and Kurt Squire. Environmental Detectives—the development of an augmented reality platform for environmental simulations. Educational technology research and development 56, 2 (2008), 203-228.

Köhn and Chia-Yi Chiu, How to Build a Complete Q-Matrix for a Cognitively Diagnostic Test. Journal of Classification 35, 2 (2018), 273-299.

Lin, Hao-Chiang Koong, Mei-Chi Chen, and Chih-Kai Chang. Assessing the effectiveness of learning solid geometry by using an augmented reality-assisted learning system. Interactive Learning Environments 23, 6 (2015), 799-810.

Lin, Hao-Chiang Koong, et al. Interacting with Visual Poems through AR-Based Digital Artwork. Turkish Online Journal of Educational Technology—TOJET 11, 1 (2012), 123-137.

Lu, Su-Ju and Ying-Chieh Liu. Integrating augmented reality technology to enhance children's learning in marine education. Environmental Education Research 21, 4, 2015, 525-541.

Marchand-Martella, Nancy E., et al. Key areas of effective adolescent literacy programs. Education and treatment of children 36, 1 (2013), 161-184.

Mayer, Richard E. and Roxana Moreno. Nine ways to reduce cognitive load in multimedia learning. Educational psychologist 38, 1 (2003), 43-52.

Osborne, J., P Black, M Smith, and J Meadows. Primary SPACE project research report: electricity. (1991).

Osborne, Roger. Towards modifying children's ideas about electric current. Research in Science & Technological Education 1, 1 (1983), 73-82.

(56) References Cited

OTHER PUBLICATIONS

Peppler, Kylie, et al. Squishing Circuits: Circuitry Learning with Electronics and Playdough in Early Childhood. Journal of Science Education and Technology 28, 2 (2019), 118-132.

Phipps, Luke, et al. Conserv-AR: A virtual and augmented reality mobile game to enhance students' awareness of wildlife conservation in Western Australia. Mobile Learning Futures—Sustaining Quality Research and Practice in Mobile Learning (2016), 214.

Mohd, Che, Yusoff Rasimah, Azlina Ahmad, and Halimah Badioze Zaman. Evaluation of user acceptance of mixed reality technology. Australian Journal of Educational Technology 27, 8 (2011).

Roussos, Louis A, et al. The fusion model skills diagnosis system. Cognitive diagnostic assessment for education: Theory and applications (2007), 275-318.

Salmi, Hannu, Helena Thuneberg, and Mari-Pauliina Vainikainen. Making the invisible observable by Augmented Reality in informal science education context. International Journal of Science Education, Part B 7, 3 (2017), 253-268.

Saltan, Fatih and Ömer Arslan. The use of augmented reality in formal education: A scoping review. Eurasia Journal of Mathematics, Science & Technology Education 13, 2 (2017), 503-520.

Sotiriou, Sofoklis and Franz X Bogner. Visualizing the invisible: augmented reality as an innovative science education scheme. Advanced Science Letters 1, 1 (2008), 114-122.

Squire, Kurt D. and Mingfong Jan. Mad City Mystery: Developing scientific argumentation skills with a place-based augmented reality game on handheld computers. Journal of science education and technology 16, 1 (2007), 5-29.

Sungkur, Roopesh Kevin, Akshay Panchoo, and Nitisha Kirtee Bhoyroo. Augmented reality, the future of contextual mobile learning. Interactive Technology and Smart Education 13, 2 (2016), 123-146.

Tatsuoka, Kikumi K., Rule space: An approach for dealing with misconceptions based on item response theory. Journal of educational measurement 20, 4 (1983), 345-354.

Tatsuoka, Kikumi K., A probabilistic model for diagnosing misconceptions by the pattern classification approach. Journal of Educational Statistics 10, 1 (1985), 55-73.

Walker, Zachary, et al. Beyond Pokémon: Augmented reality is a universal design for learning tool. SAGE Open 7, 4 (2017), 2158244017737815.

Williams, Tory, et al. A High Quality Educative Curriculum in Engineering Fosters Pedagogical Growth. International Journal of Research in Education and Science 5, 2 (2019), 657-680.

Wilson, Andrew D. and Sabrina Golonka. Embodied cognition is not what you think it is. Frontiers in psychology 4 (2013), 58.

\* cited by examiner

AUGMENTED REALITY PLATFORM FOR COLLABORATIVE CLASSROOMS

This application is a continuation of U.S. patent application Ser. No. 16/698,347, filed on Nov. 27, 2019, the contents of which are hereby incorporated by reference in its entirety. U.S. patent application Ser. No. 16/698,347 claims the benefit of priority of U.S. provisional application Ser. No. 62/772,416, filed on Nov. 28, 2018 and U.S. provisional application Ser. No. 62/927,683, filed on Oct. 30, 2019 the disclosures of which are herein incorporated by reference in their entireties.

GOVERNMENT LICENSE RIGHTS

This invention was made with government support under DUE1839971 and OIA1937036 awarded by the National Science Foundation. The government has certain rights in the invention.

FIELD

The system and methods disclosed in this document relate to augmented reality and, more particularly, to augmented reality based classroom learning.

BACKGROUND

Unless otherwise indicated herein, the materials described in this section are not prior art to the claims in this application and are not admitted to the prior art by inclusion in this section.

Augmented reality (AR), which overlays virtual content onto the physical world, offers an entirely new medium for development and delivery of educational and training content. Augmented reality provides students with the unique opportunity of learning-while-making, and enables the acquisition of knowledge through a "hands-on, minds-on approach". Currently, existing applications of augmented reality for classroom activities have typically been programmed/animated using tools such as Unity, Unreal Engine or libraries available for programmers such as Google ARCore and Apple ARKit. Accordingly, the process for developing augmented reality learning experiences requires considerable coding or animation experience. Furthermore, these applications lack the support for ease of creation of an educational curriculum, which can usually be a creative and iterative process, and a workflow to foment synergistic collaboration between instructors and students. Additionally, interest-driven classes that merge rigorous concepts from science, technology, engineering, and mathematics (STEM) learning can benefit from a project-based curriculum that emphasizes collaborative inquiry and learning. A collaborative classroom facilitates instructors and students working together towards solving project-oriented lessons and engaging in different types of interactions. These interactions allow them to answer each other's questions and empower sharing and clarifying the learning content.

Accordingly, it would be advantageous to provide a system for intuitive and iterative development of augmented reality learning experiences without prior coding or animation experience. Additionally, it would be beneficial if the system for augmented reality learning experiences is tailored towards enabling and moderating collaborative interactions in the classroom. Moreover, the system needs to take all stakeholders of the learning process into account: instructors, teaching assistant, and students.

SUMMARY

A method for providing augmented reality content as a user performs a task in a real-world workspace is disclosed. The method comprises storing, in a memory, first augmented reality content, the first augmented reality content including at least one first graphical element associated with each of a plurality of steps of the task. The method comprises displaying, on a display screen, a graphical user interface including, superimposed on images of the real-world workspace, the at least one first graphical element that is associated with a step of the plurality of steps that is currently being performed by the user. The method comprises generating, with the processor, second augmented reality content based on inputs received from the user via the graphical user interface, the second augmented reality content including at least one second graphical element associated with a step of the plurality of steps.

A method for generating augmented reality content to be provided during performance of a task in a real-world workspace is disclosed. The method comprises displaying, on a display screen, a graphical user interface including a virtual representation of the real-world workspace. The method comprises generating, with the processor, first augmented reality content based on inputs received from the user via the graphical user interface, the first augmented reality content including at least one first graphical element associated with each of a plurality of steps of the task. The method comprises uploading, with the processor, the first augmented reality content to a remote server.

BRIEF DESCRIPTION OF THE DRAWINGS

The foregoing aspects and other features of the augmented reality system are explained in the following description, taken in connection with the accompanying drawings.

DETAILED DESCRIPTION

Figure 1:
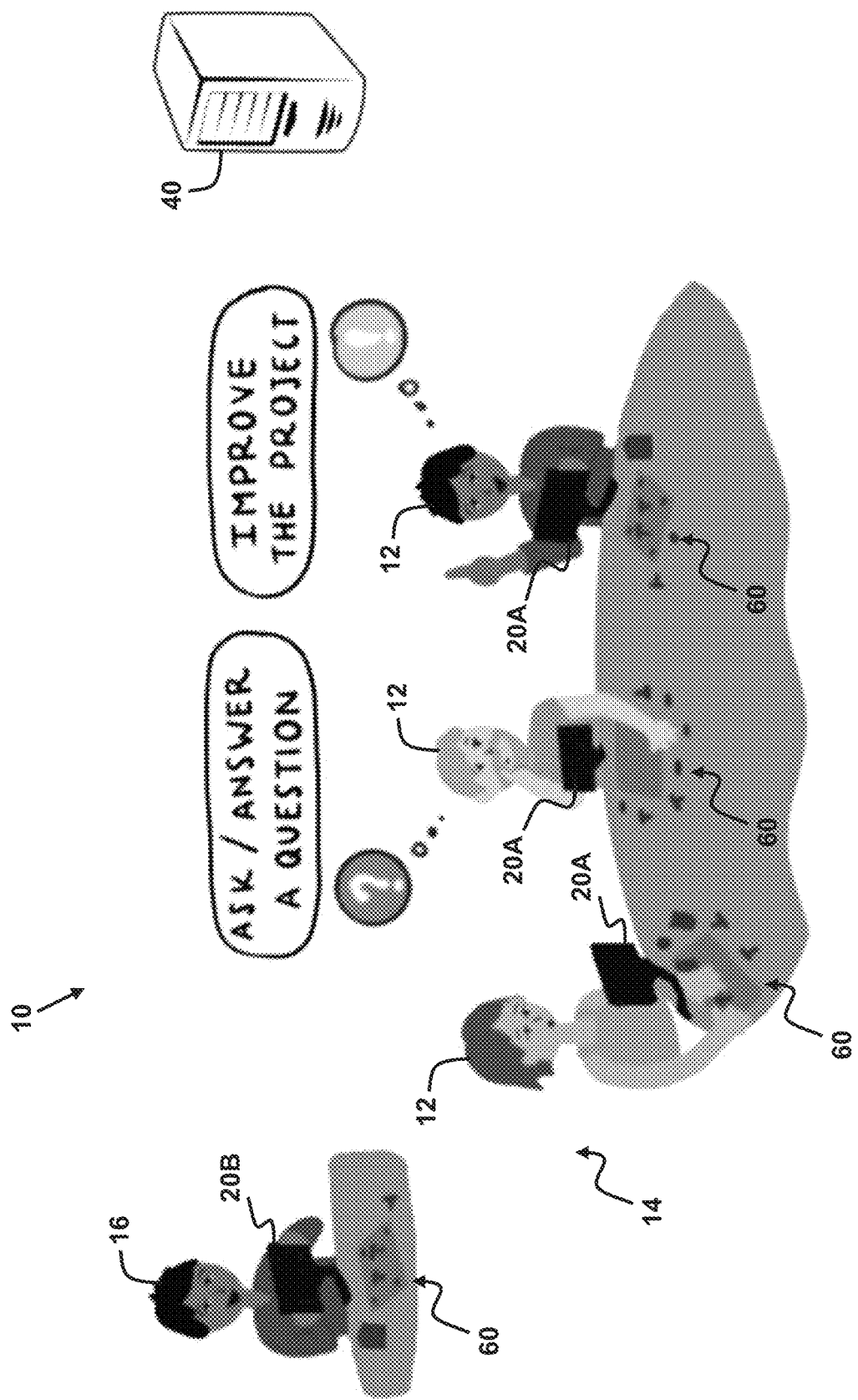
FIG. 1 shows an exemplary embodiment of an augmented reality system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

Figure 2:
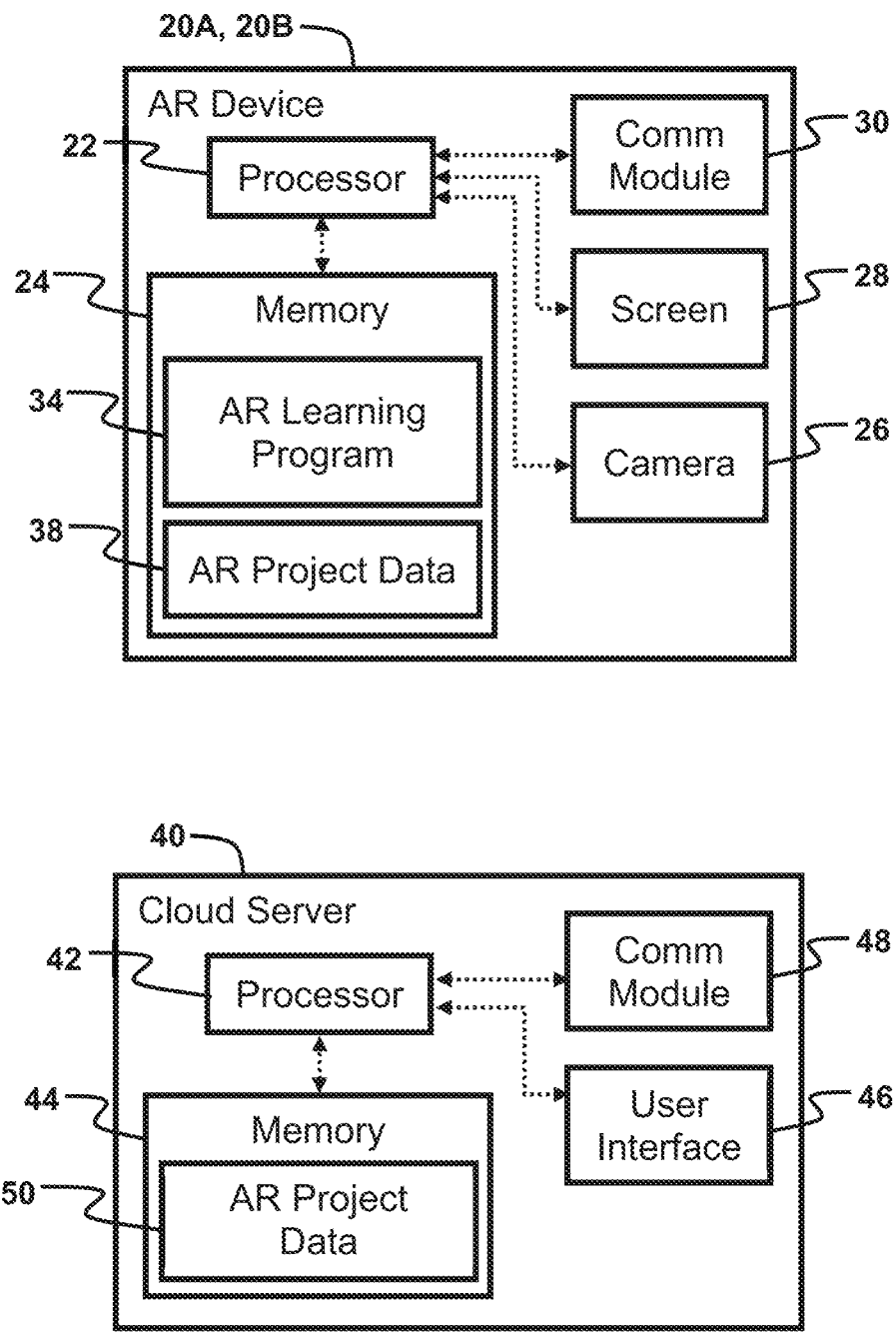
FIG. 2 shows exemplary components of the augmented reality devices and the cloud server of FIG. 1.

With reference to FIGS. 1-2, exemplary embodiments of an augmented reality (AR) system 10 for developing and providing augmented reality learning experiences are shown. The augmented reality system 10 advantageously combines augmented reality with the capabilities of cloud technology to provide a pull-based collaborative model, in which students and instructors collaborate by uploading, sharing, and downloading augmented reality learning content. The augmented reality system 10 enables students to improve the augmented reality learning content by adding contributions to the original augmented reality learning content that was created by an instructor.

As shown in FIG. 1, the augmented reality system 10 includes a plurality of augmented reality devices 20A utilized by students 12 in a classroom 14 and at least one augmented reality device 20B utilized by an instructor 16 of the classroom 14, which enable the instructor to provide a collaborative augmented reality learning experience to his or her students. The augmented reality devices 20A, 20B may comprise any computing device, such as, but not limited to, a smartphone, a tablet computer, a handheld camera, a head mounted display, or the like. In some embodiments, the augmented reality device 20B utilized by an instructor 16 may instead comprise a traditional computer, such as a laptop or desktop computer, that is not equipped with a camera for providing augmented reality. The augmented reality system 10 further includes a cloud server 40 for managing augmented reality project data. The cloud server 40 may comprise one or more remote computer servers or equivalent remote data processing and storage devices.

The augmented reality devices 20A enable students 12 to download augmented reality project data, which has been developed at least in part by the instructor 16, and engage with an augmented reality learning experience defined by the augmented reality project data. Particularly, augmented reality project data defines a plurality of steps or subtasks that collectively comprise a task to be performed by the student 12 in his or her workspace 60. The workspace 60 comprises a real-world environment, an area of a desk, table, floor, or the like. The workspace 60 generally includes a variety of objects, components, or structures situated therein that are manipulated by the student 12 during each step, in order to complete the task. During the augmented reality learning experience, the augmented reality devices 20A are arranged such that a camera thereof has a view of the workspace 60. Real-time images/video of the workspace 60 are displayed on a display screen of the augmented reality devices 20A with graphical elements superimposed thereon that provide instruction and learning aid to the student 12 as he or she completes the task.

The augmented reality system 10 advantageously enables students 12 to author additional augmented reality content for usage by other students 12 in completing the task during a particular classroom session, as well as for long-term incorporation and improvement of the task into the augmented reality project data for usage in future classroom sessions. In particular, the augmented reality system 10 enables two distinct types of collaborative interaction modalities in that moderate the flow of augmented reality content contributions: local pulls and global pulls.

Local pulls include augmented reality content sharing between students during a particular classroom session. For example, as students 12 complete the task with the aid of the augmented reality devices 20A, students 12 can ask questions about particular steps using their augmented reality devices 20A. Other students 12 can see questions asked by their classmates and generate additional augmented reality content that helps to answer another student's question, thus relieving some of the burden from the instructor 16. Local pulls are viewed by the students requesting the help in the form of the additional augmented reality content, but these contributions do not become changes to the project for the rest of the class. The additional augmented reality content may, for example, comprise a text annotation, a drawing annotation, a video, or an image. The students 12 can submit their augmented reality content contribution using their augmented reality device 20A for other students 12 to view during the classroom session.

In contrast, global pulls are student contributions of augmented reality learning content that have to be approved by the instructor 16 to become a general addition to the original augmented reality project data for long-term inclusion as a part of the augmented reality learning experience. For example, after class, the instructor 16 can review all of the content contributions made by the students and determine which content contributions are the most appropriate to add to augmented reality project data. Thus, the augmented reality system 10 enables an iterative improvement workflow for augmented reality project data and enables synergistic collaboration that empowers students to be active agents in the learning experience.

The augmented reality device 20B enables the instructor 16 to author the augmented reality learning experience using simple drag-and-drop based interactions, such that the instructor 16 does not need to have extensive experience in programing or animation to develop high quality augmented reality learning experience for his or her students. The instructor 16 can publish augmented reality project data to the cloud server 40 using the augmented reality device 20B. Additionally, the instructor 16 can use there the augmented reality device 20B to view global pull requests having student contributions and approve or deny the student contributions for long-term inclusion as a part of the augmented reality learning experience.

The cloud server 40 is configured to manage the augmented reality project data for one or more augmented reality learning experiences. Additionally, the cloud server 40 manages the flow of augmented reality content contributions between students during a classroom session (i.e. local pulls) and between student and instructor after each classroom session (i.e., global pulls).

FIG. 2 shows exemplary components of the augmented reality devices 20A, 20B and the cloud server 40 of the augmented reality system 10. It will be appreciated that the components of the augmented reality devices 20A, 20B and the cloud server 40 shown and described herein are merely exemplary and that the augmented reality devices 20A, 20B and the cloud server 40 may comprise any alternative configuration. Moreover, in the illustration of FIG. 2, the augmented reality devices 20A, 20B are illustrated and described as having identical components and functions. However, the augmented reality devices 20A, 20B may take different forms and have heterogeneous configurations and components. Particularly, as noted above, in some embodiments, the augmented reality device 20B utilized by the instructor 16 may instead comprise a traditional computer, such as a laptop or desktop computer, that is not equipped with a camera for providing augmented reality.

In the illustrated exemplary embodiment, each augmented reality device 20A, 20B comprises a processor 22, a memory 24, a camera 26, a display screen 28, and at least one network communications module 30. The processors 22 are configured to execute instructions to operate the respective augmented reality device 20A, 20B to enable the features, functionality, characteristics and/or the like as described herein. To this end, the processor 22 is operably connected to the memory 24, the camera 26, the display screen 28, and the network communications module 30. The processors 22 generally comprise one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 22 may include a system with a central processing unit, graphics processing units, multiple processing units, dedicated circuitry for achieving functionality, programmable logic, or other processing systems.

The memories 24 are configured to store data and program instructions that, when executed by the processors 22, enable the augmented reality devices 20A, 20B to perform various operations described herein. The memories 24 may be of any type of device capable of storing information accessible by the processors 22, such as a memory card, ROM, RAM, hard drives, discs, flash memory, or any of various other computer-readable medium serving as data storage devices, as will be recognized by those of ordinary skill in the art.

The cameras 26 are configured to capture a plurality of images of the workspace 60 of the respective student (or instructor). The cameras 26 are configured to generate image frames of the workspace 60, each of which comprises a two-dimensional array of pixels. Each pixel has corresponding photometric information (intensity, color, and/or brightness). In some embodiments, the cameras 26 are configured to generate RGB-D images in which each pixel has corresponding photometric information and geometric information (depth and/or distance). In such embodiments, the cameras 26 may, for example, take the form of two RGB cameras configured to capture stereoscopic images from which depth and/or distance information can be derived, and/or an RGB camera with an associated IR camera configured to provide depth and/or distance information.

The display screens 28 may comprise any of various known types of displays, such as LCD or OLED screens. In some embodiments, the display screens 28 may comprise touch screens configured to receive touch inputs from a user. In the case of a head-mounted display, the augmented reality device 20 may comprise a transparent screen, through which a user can view the outside world, configured to superimpose certain graphical elements onto the user's view of the outside world.

The network communications modules 30 may comprise one or more transceivers, modems, processors, memories, oscillators, antennas, or other hardware conventionally included in a communications module to enable communications with various other devices, at least including the other augmented reality device(s) 20A, 20B and the cloud server 40. In at least some embodiments, the network communications modules 30 include Wi-Fi modules configured to enable communication with a Wi-Fi network and/or Wi-Fi router (not shown). In further embodiments, the network communications modules 30 may further include Bluetooth® modules and communications devices configured to communicate with wireless telephony networks.

The each augmented reality device 20A, 20B may also include a respective battery or other power source (not shown) configured to power the various components within the respective augmented reality device 20A, 20B. In one embodiment, the batteries of the augmented reality devices 20A, 20B are a rechargeable battery configured to be charged when the respective augmented reality device 20A, 20B is connected to a battery charger configured for use with the respective augmented reality device 20A, 20B. In some embodiments, the augmented reality devices 20A, 20B include additional user interfaces (not shown) such as a mouse or other pointing device, a keyboard or other keypad, speakers, and a microphone.

In at least one embodiment, the memories 24 store an augmented reality learning program 34, as well as augmented reality project data 36. As discussed in further detail below, the processors 22 are configured to, in a student mode, execute the augmented reality learning program 34, with reference to the augmented reality project data 36, to provide a graphical user interface in which real-time images/video captured by the respective camera 26 are displayed on the respective display screen 28 with graphical elements superimposed thereon, as well as provide various collaborative features and interactions. Likewise, the processors 22 are configured to, in an instructor mode, execute the augmented reality learning program 34 to provide a graphical user interface for authoring augmented reality project data.

With continued reference to FIG. 2, exemplary components of the cloud server 40 are described. The cloud server 40 includes a processor 42, a memory 44, a user interface 46, and a network communications module 48. It will be appreciated that the illustrated embodiment of the cloud server 40 is only one exemplary embodiment of a cloud server 40 and is merely representative of any of various manners or configurations of a personal computer, server, or any other data processing systems that are operative in the manner set forth herein.

The processor 42 is configured to execute instructions to operate the cloud server 40 to enable the features, functionality, characteristics and/or the like as described herein. To this end, the processor 42 is operably connected to the memory 44, the user interface 46, and the network communications module 48. The processor 42 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 42 may include a system with a central processing unit, graphics processing units, multiple processing units, dedicated circuitry for achieving functionality, programmable logic, or other processing systems.

The memory 44 are configured to store data and program instructions that, when executed by the processor 42, enable the cloud server 40 to perform various operations described herein. The memory 44 may be of any type of device capable of storing information accessible by the processor 42, such as a memory card, ROM, RAM, hard drives, discs, flash memory, or any of various other computer-readable medium serving as data storage devices, as will be recognized by those of ordinary skill in the art. As will be described in further detail below, the memory 44 stores augmented reality project data 50 that defines one or more augmented reality interactive learning experiences than can be provided using one of the augmented reality devices 20A, 20B.

The network communications module 48 of the cloud server 40 provides an interface that allows for communication with any of various devices, at least including the augmented reality devices 20A, 20B. In particular, the network communications module 48 may include a local area network port that allows for communication with a local area network, such one associated with the Wi-Fi network and/or Wi-Fi router mentioned above. In one embodiment, the network communications module 48 is equipped with a Wi-Fi transceiver or other wireless communications device.

Accordingly, it will be appreciated that communications between the cloud server 40 and the augmented reality devices 20A, 20B may occur via wireless communications or a combination of wired and wireless communication. Communications may be accomplished using any of various known communications protocols.

The cloud server 40 may be operated locally or remotely by a user. To facilitate local operation, the cloud server 40 may include a user interface 46. In at least one embodiment, the user interface 46 may suitably include an LCD display screen or the like, a mouse or other pointing device, a keyboard or other keypad, speakers, and a microphone, as will be recognized by those of ordinary skill in the art. Alternatively, in some embodiments, a user may operate the cloud server 40 remotely from another computing device which is in communication therewith via the network communications module 48 and has an analogous user interface.

Augmented Reality Learning Experiences

Figure 3A:
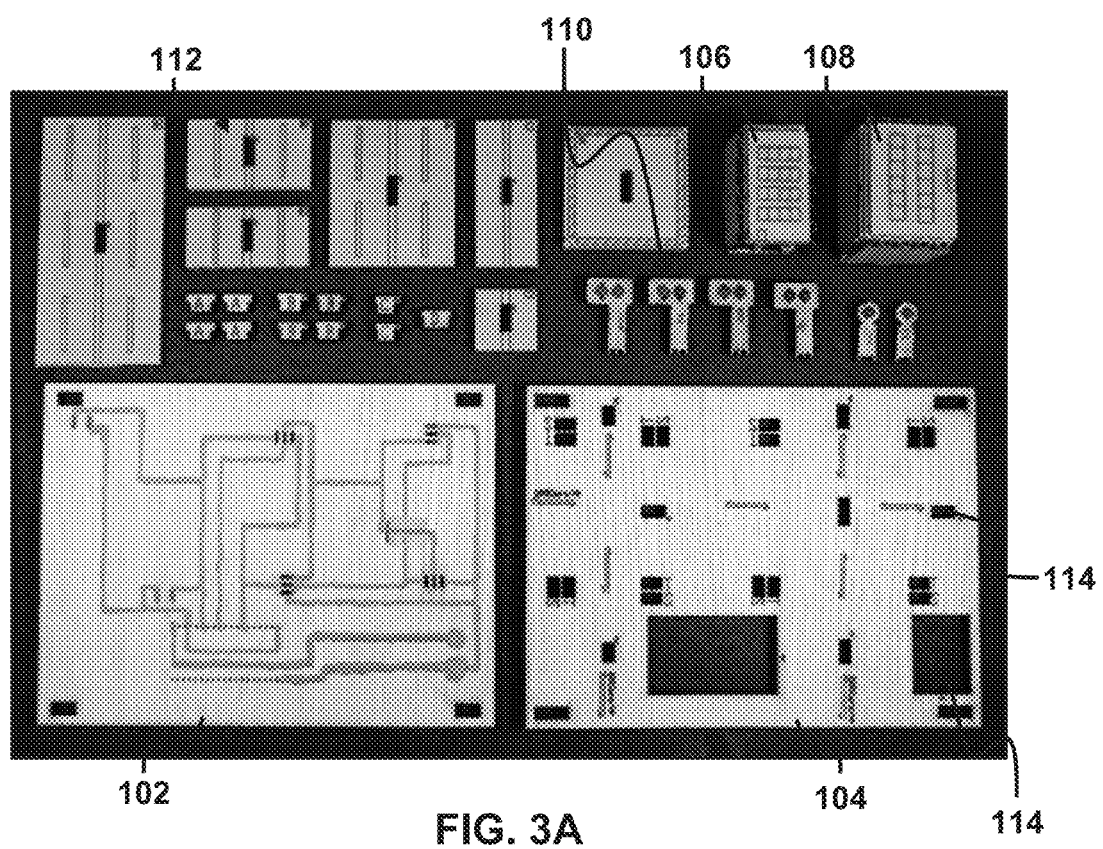
FIGS. 3A and 3B illustrate an exemplary augmented reality learning experience that can be provided using the augmented reality system.
Figure 3B:
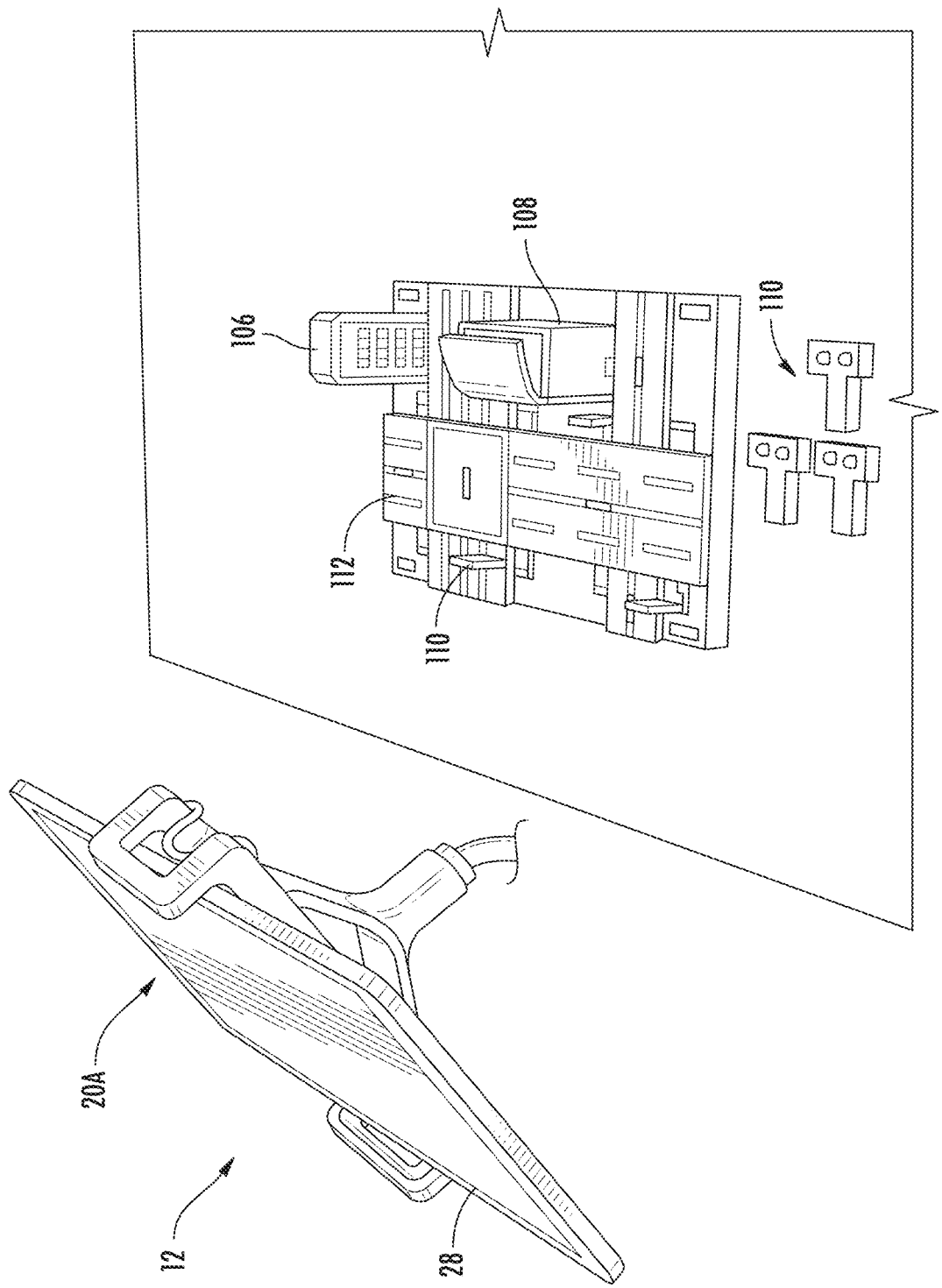

FIGS. 3A and 3B illustrate an exemplary augmented reality learning experience that can be provided using the augmented reality system 10. In the example, an instructor 16 has generated augmented reality project data for a task involving the assembly of a miniature smart city from a plurality of pre-fabricated components. The task is broken down into a sequence of steps. The augmented reality project data defines the sequence of steps and includes one or more graphical elements associated with each step in the sequence of steps.

FIG. 3A shows the plurality of pre-fabricated components that are to be assembled according to the sequence of steps to build the miniature smart city. The components include a circuit board 102 having pre-drawn electrical circuitry using conductive ink and an upper base 104 that is placed atop the circuit board 102 and upon which additional components are installed by the student 12 during the augmented reality learning experience. The additional components include a battery 106 disguised as a miniature building, a controller 108 disguised as a miniature building, miniature traffic lights 110, and miniature road segments 112. The additional components 106, 108, 110, and 112 can be installed into slots 114 of the upper base 104.

FIG. 3B shows a student 12 using an augmented reality device 20A arranged such that the camera 26 thereof has a view of the student's workspace 60, in which the student is in the process of performing the sequence of steps to build the miniature smart city. As the student 12 builds the miniature smart city, he or she is presented with a graphical user interface on the display 28 of the augmented reality device 20A in which graphical elements from the augmented reality project data are superimposed on images of the real-world workspace 60.

Figure 4:
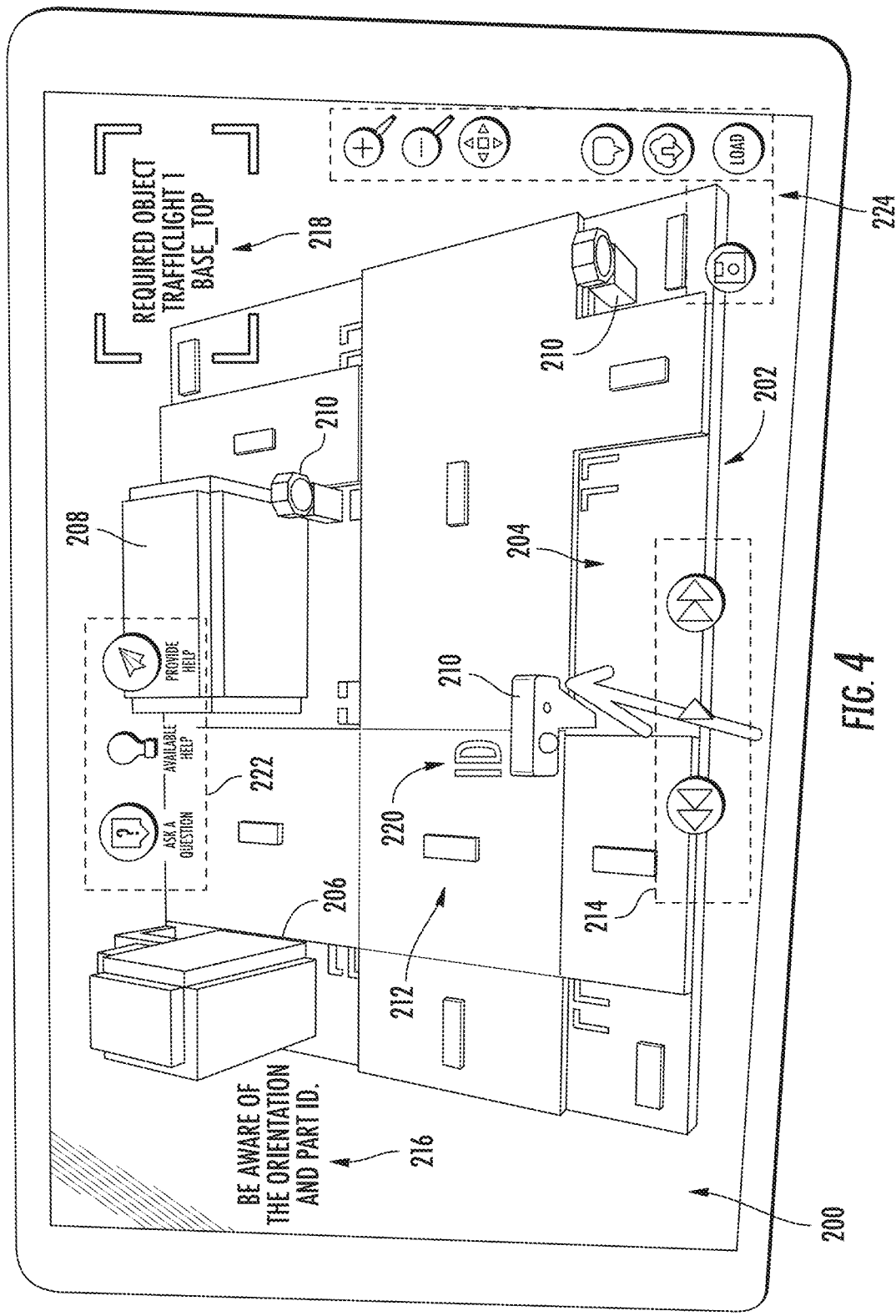
FIG. 4 shows a graphical user interface for providing an augmented reality learning experience.

FIG. 4 shows a graphical user interface 200 for providing an augmented reality learning experience. The graphical user interface 200 includes a plurality of graphical elements super imposed on real-time images and/or video of the real-world workspace 60. Additionally, the graphical user interface 200 includes a plurality of virtual buttons and/or virtual controls via which the student 12 can provide inputs to the augmented reality device 20A for the purpose of manipulating the graphical user interface 200, as well as for the purpose of generating additional augmented reality content (discussed in greater detail below).

The graphical elements of the graphical user interface 200 include a three-dimensional model for each of the real-world components 102-112 that are assembled to build the miniature smart city. Particularly, the graphical user interface 200 include a three-dimensional model 202 corresponding to the circuit board 102, a three-dimensional model 204 corresponding to the upper base 104, a three-dimensional model 206 corresponding to the battery 106 disguised as a miniature building, a three-dimensional model 208 corresponding to the controller 108 disguised as a miniature building, three-dimensional models 210 corresponding to the traffic lights 110, and three-dimensional models 212 corresponding to the road segments 112. As shown, the three-dimensional models are superimposed upon the corresponding real-world components or superimposed at a position in the real-world workspace 60 at which the real-world component is to be installed.

The graphical user interface 200 includes virtual controls 214 for navigating the sequence of steps defined by the augmented reality project data for building the miniature smart city. Particularly, the virtual controls 214 include a previous step button (left), a play animation button (middle), and a next step button (right), via which the student 12 can navigate from one step to another as he or she progresses through the augmented reality learning experience.

The graphical elements of the graphical user interface 200 update dynamically depending on which step in the sequence of steps is being performed. Particularly, the three-dimensional models 202-212 are arranged to show the expected state of progress of the miniature smart city as a result of that particular step in the sequence of steps. Additionally, at least for some steps, the graphical elements include an animation of the step that is to be performed. In this way, the student 12 can see visually what he or she is expected to do at each.

In some embodiments, the augmented reality system 10 utilizes various different mechanisms for automatically setting the spatial coordinates upon which to overlay the three-dimensional models. First, QR code tracking or equivalent marking-based tracking can be used to track individual components so as to overlay content directly on a tracked component. Second, basic ground detection can be used to establish spatial coordinates, which provides no tracking of objects but sets reference coordinates for augmented reality overlays on top of surfaces. Additionally, the user can also manually adjust the size and location of three-dimensional models to be off to the side, rather than overlaid on the real-world components.

The graphical elements of the graphical user interface 200 further include learning aids that provide additional guidance and advice to the student 12 as he or she performs each step. In the illustrated example, the learning aids include text annotations 216 and 218 (e.g., "Be aware of the orientation and Part ID." and "Required Object traffic light 1 base top") and a drawing annotation 220 (e.g., virtual markings "ID" with an arrow). Additionally, learning aids (not shown) may include highlighting, a video, an image, a diagram, or a button enabling the student to play a relevant audio recording.

The graphical user interface 200 further includes virtual controls 222 for collaborating with other students. Particularly, the virtual controls 222 include an ask a question button (left), an available help button (middle), and a provide help button (right), via which the student 12 can utilized the collaborative features of the augmented reality system 10, which are discussed in greater detail below.

Finally, the graphical user interface 200 includes virtual controls 224 for zooming in and out, downloading augmented reality project data, saving augmented reality content, rating augmented reality content, etc.

Authoring Augmented Reality Learning Experiences

Figure 5:
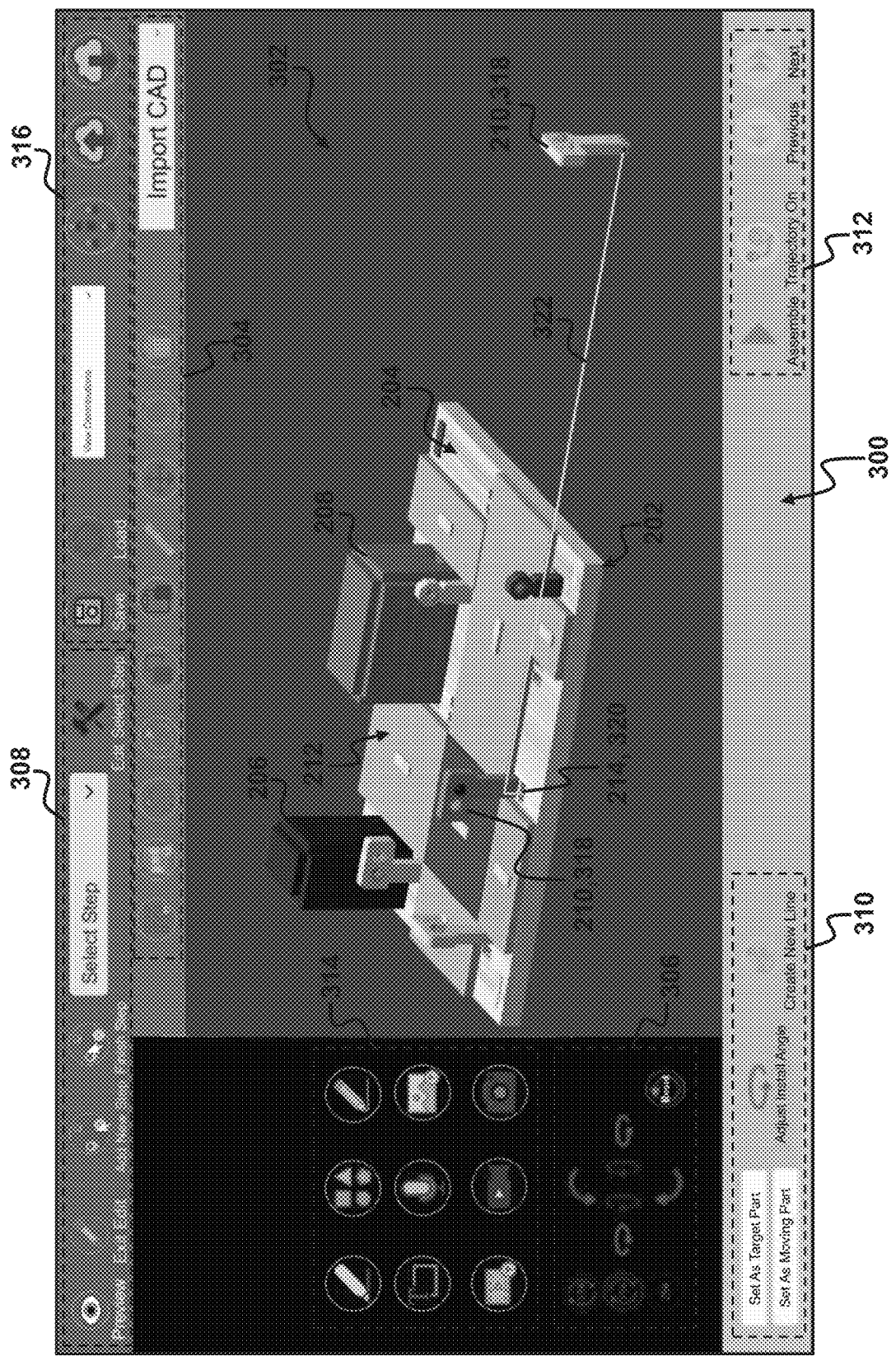
FIG. 5 shows a graphical user interface for authoring an augmented reality experience.

FIG. 5 shows a graphical user interface 300 for authoring augmented reality experiences. The graphical user interface 300 at least includes a digital canvas 302 that provides a virtual space to place three-dimensional models representing components of the task to be performed, create animations illustrating steps of the task, and create other learning aids to assist the student in performing the task. Particularly, the digital canvas 302 comprises a virtual representation of a workspace in which the instructor 16 places three-dimensional models of one or more real-world components that will be utilized to perform that task that is to be performed. In the illustrated example, the digital canvas 302 includes the three-dimensional models 202-212 that are assembled to build the miniature smart city, described above. Using the graphical user interface 300, the instructor 16 provides user inputs to manipulate the three-dimensional models 202-212 using easy to use virtual buttons and drag-and-drop controls to illustrate the expected state of progress of the task as a result of each particular step in the sequence of steps. As used herein, providing inputs or receiving inputs via a graphical user interface or using a graphical user interface refers to the user touching elements of the graphical user interface a touch screen display, clicking on elements of the graphical user interface via a mouse pointer, or otherwise selecting elements of the graphical user interface using any other user interface known in the art.

The graphical user interface 300 includes a canvas tool bar 304 having virtual controls for manipulating the three-dimensional models 202-212. The virtual controls of the canvas tool bar 304 include virtual buttons for initially setting up the augmented reality environment including setting and/or obtaining fiducial markers (such as QR codes or other trackable markings) that are placed in the workspace, binding them to a three-dimensional model, or associating data to a position within the workspace. The virtual controls of the canvas tool bar 304 include virtual buttons for importing three-dimensional models, for copying, cutting, and pasting three-dimensional models, for selecting, dragging, and dropping three-dimensional models, undoing and redoing manipulations within the digital canvas 302, and deleting three-dimensional models. The graphical user interface 300 further includes angle and orientation adjustment tools 306 having virtual controls for manipulating the angle and orientation of a selected three-dimensional model.

The graphical user interface 300 includes a task editing toolbar 308 having virtual controls for defining the sequence of steps that make up the task that is to be performed during the augmented reality learning experience. The virtual controls of the task editing tool bar 308 include virtual buttons for adding a new step, finishing a step, selecting a step from the sequence of steps, and previewing the sequence of steps or a particular step. The virtual controls of the task editing tool bar 308 include virtual buttons for entering and exiting a step editing mode in which the instructor manipulates the digital canvas 302 to illustrate the expected state of progress of the task as the selected step in the sequence of steps, as described above.

While in the step editing mode, in addition to manipulating the digital canvas 302 as described above, the instructor 16 can create one or more animations for the step that visually aids the student in performing the step. To this end, the graphical user interface 300 includes object animation tools 310 that enable the instructor 16 to create object animations one at a time in the digital canvas 302. Particularly, to create a new animation path from a three-dimensional model moving towards a target three-dimensional model, the instructor 16 selects the Set As Moving Part button (bottom-left) and then selects the three-dimensional model that is to be the moving part 318 (e.g., a traffic light 310) in the animation. Once the moving part 318 is identified, the instructor 16 selects the Set As Target Part button (top-left) and then selects to target part 320 (e.g., a slot 214 of the upper base 204) to toward which the moving part 318 should move during the animation. A path 322 is automatically generated from the object to the target. Finally, the instructor selects the Adjust Install Angle button to adjust the installation angle of the moving part as need. The animation features include two types of manipulations: (1) transform an object, which allows the instructor to change the coordinates of the object in the scene, and (2) pivot point selection, which allows the path to be generated from a specific point or line from the object towards a specific point or line from the target. The graphical user interface 300 further includes animation controls 312 that enable the instructor 16 to play the animations, rewind the animations, fast forward the animations, and hide or show the trajectory of the animation path 322.

While in the step editing mode, the instructor 16 can create a variety of additional types of learning aids and other augmented reality content that can be presented to the student in association with a particular step. To this end, the graphical user interface 300 includes an animation palette 314 having virtual controls for creating a variety of learning aids and other augmented reality content. The virtual controls of the animation palette 314 include drawing buttons (top-right and top-middle) that enable the instructor to create drawing annotations in the form of virtual markings or virtual shapes. The virtual controls of the animation palette 314 include a highlighting button (top-left) that enables the instructor to select particular three-dimensional model to be highlighted. The virtual controls of the animation palette 314 include a text button (middle-left) that enables to instructor to create a text annotation by entering text via a virtual/physical keyboard. The virtual controls of the animation palette 314 include a recording button (middle) that enables the instructor to record an audio annotation via a microphone. The virtual controls of the animation palette 314 include video buttons (bottom-left and bottom-middle) that enable to instructor to capture a video with the camera 26 or import a video already locally stored on the memory 24. Finally, the virtual controls of the animation palette 314 include image buttons (middle-right and bottom-right) that enable to instructor to capture an image with the camera 26 or import an image already locally stored on the memory 24.

Finally, the graphical user interface 300 includes a collaboration panel 316 having virtual controls for file management and reviewing global pull requests. Particularly, the virtual controls of the collaboration panel 316 include buttons for saving and loading augmented reality project data, uploading and/or publishing the augmented reality project data to the cloud server 30, downloading augmented reality project data from the cloud server 30, and downloading global pull requests from the cloud server 30, and reviewing contributions of additional augmented reality content by students included with the global pull requests.

Local Collaboration and Contributions During a Classroom Session

Figure 6:
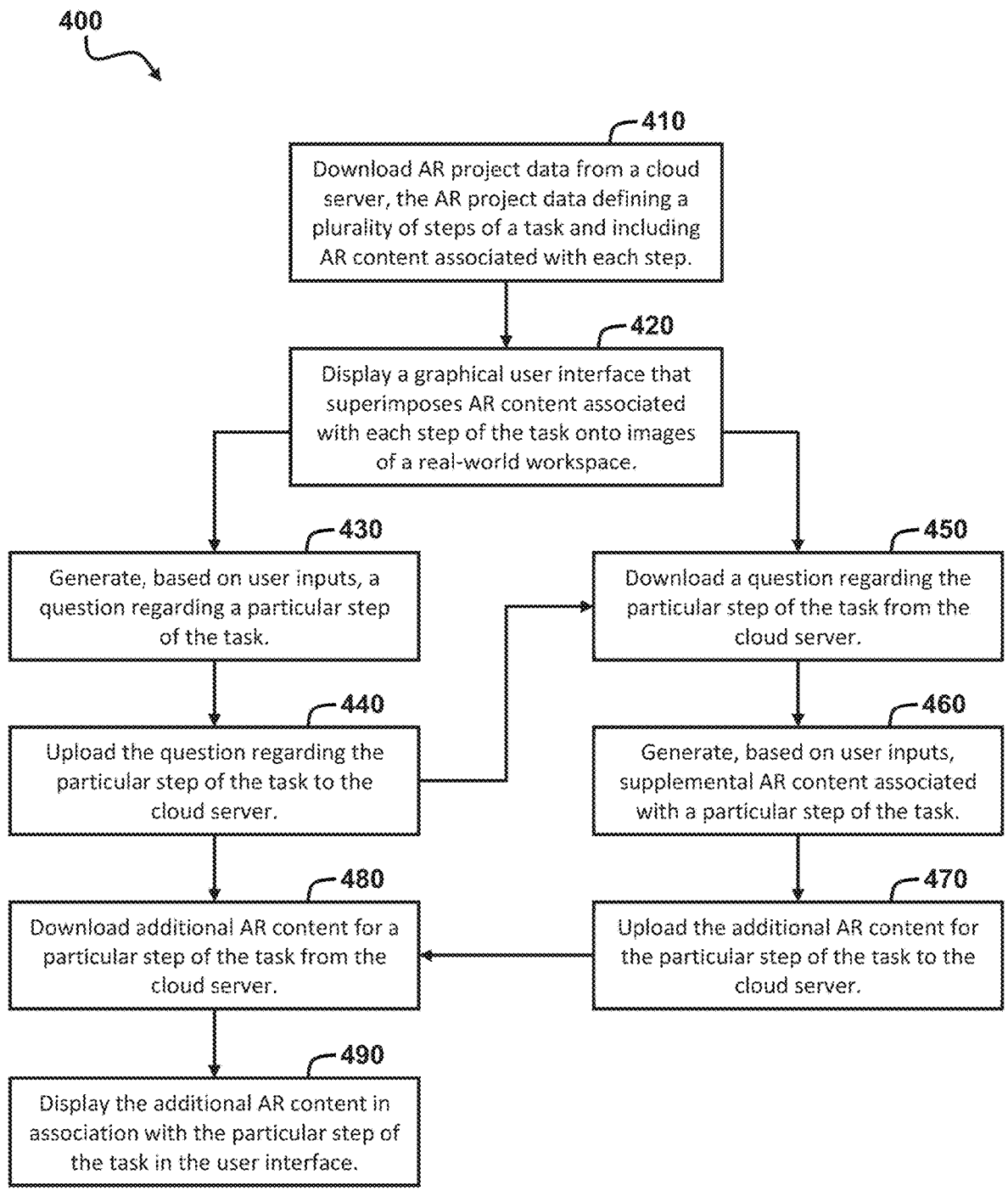
FIG. 6 shows a logical flow diagram for a method of local collaboration and contribution with respect to an augmented reality learning experience.

FIG. 6 shows a logical flow diagram for a method 400 of local collaboration and contribution during a classroom session with respect to an augmented reality learning experience. In the description of the method, statements that a method, process, processor, and/or system is performing some task or function refers to a controller or processor (e.g., the processor 22 of an augmented reality device 20A or the processor 42 of the cloud server 40) executing programmed instructions stored in non-transitory computer readable storage media (e.g., the memory 24 of a augmented reality device 20A or the memory 44 of the cloud server 40) operatively connected to the controller or processor to manipulate data or to operate one or more components in the augmented reality system 10 to perform the task or function. Additionally, the steps of the methods may be performed in any feasible chronological order, regardless of the order shown in the figures or the order in which the steps are described.

The method 400 embodies the "local pull" interaction modality of the augmented reality system 10. Local pull requests are approved by students in need of help, and sent by students who offer help. Students can help out others by adding explanatory augmented reality content (e.g., images, video, text, drawings, etc.) to the project and sharing it by submitting a local pull request. Once local pull requests are submitted, struggling students can browse the suggestions provided by contributors and choose the most helpful ones. These contributions only take effect on their local device. This local collaboration process, which happens during class without instructor's involvement, encourages interactions among students while reducing their reliance on instructors.

The method 400 begins with a step of downloading augmented reality project data from a cloud server, the augmented reality project data defining a plurality of steps of a task and including augmented reality content associated with each step (block 410). Particularly, during or prior to a classroom session in which an augmented reality learning experience is to be had by students 12 of a class or other learning environment, each student 12 operates his or her augmented reality device 20A to download augmented reality project data for the augmented reality learning experience. In response to corresponding user inputs via the graphical user interface 200 or otherwise, the processor 22 of the augmented reality device 20A operates the network communications module 30 to request augmented reality project data from the cloud server 40. In response to a request, the processor 42 of the cloud server 40 operates the network communications module 48 to transmit to the augmented reality device 20A the augmented reality projected data 50. The processor 22 of the augmented reality device 20A operates the network communications module 30 to receive the augmented reality project data 50 from the cloud server 40 and stores it as the augmented reality project data 38 in the memory 24.

As used herein, "augmented reality content" refers to one or more data files including one or more virtual or digital elements that are to be or can be superimposed upon real-time images or video of a real-world environment. The virtual or digital elements may include any audio, visual, and/or graphical elements. For example, the virtual or digital elements may include two-dimensional images, sprites, icons, textures, vector graphics, or similar. Additionally, the virtual or digital elements may include three-dimensional models, polygon meshes, point clouds, or similar. Likewise, the virtual or digital elements may include two-dimensional or three-dimensional animations, recorded motion capture data, videos, or any other time sequence of graphical content. The virtual or digital elements may include interactive and/or dynamic content such as another augmented reality project, in which interactions and animations have been built already.

The augmented reality project data 38, 50 generally includes a plurality of data files of different formats including videos files (e.g., "filename.mp4"), image files (e.g., "filename.jpg"), three-dimensional model files (e.g., "filename.obj"), and text files (e.g., "filename.txt"). In some cases, augmented reality project data may comprise smaller augmented reality projects in their entirety. The augmented reality project data 38, 50 may further include an index file, such as a structured .xml file, or similar that stores the metadata of every file in the project. These metadata may include file index numbers, file types, creator ID, and many other file attributes. The augmented reality project data 38, 50 may further includes a project file that stores information that defines the plurality of steps that make up the task that is to be performed during the augmented reality learning experience. In some embodiments, the project file and/or the index file defines which of the data files are associated with which steps of task and how the data files are to be used or presented in association with each step, as well as the manner in which graphical elements are to be presented. It will be appreciated that the particular organization and structure of the augmented reality project data 38, 50 can take many forms and generally corresponds to the particular standards or requirements of the augmented reality learning program 34 that will utilize the augmented reality project data 38, 50.

The method 400 continues with a step of displaying a graphical user interface that superimposes augmented reality content associated with each step of the task onto images of a real-world workspace (block 420). Particularly, the processor 22 of the augmented reality device 20A reads from the augmented reality project data 38, 50 the information and multimedia augmented reality content associated with a particular step of the task to be performed during the augmented reality learning experience. In at least one embodiment, the processor 22 begins by reading the information and multimedia augmented reality content associated with a chronologically first step in the sequence of steps. The processor 22 operates the camera 26 to capture real-time images of the real-world workspace 60. Finally, the processor 22 renders, and operates the display screen 28 to display, a graphical user interface including, superimposed on the real-time images of the real-world workspace 60, at least one graphical element of the augmented reality content that is associated with the particular step currently being performed by the student 12.

The graphical user interface rendered and displayed by the processor 22 comprises various virtual controls and/or buttons for providing receiving inputs from the student. The at least one graphical element that is superimposed on the real-time images of the real-world workspace 60 may comprise three-dimensional models arranged to show the expected state of progress of the task as a result of the current step in the sequence of steps. At least for some steps, at least one graphical element that is superimposed on the real-time images of the real-world workspace 60 may comprise an animation of the step that is to be performed. At least one graphical element that is superimposed on the real-time images of the real-world workspace 60 may further comprise learning aids such as text annotations, drawing annotations, highlighting, a video, an image, a diagram, or a button enabling the student to play an audio recording.

Figure 7:
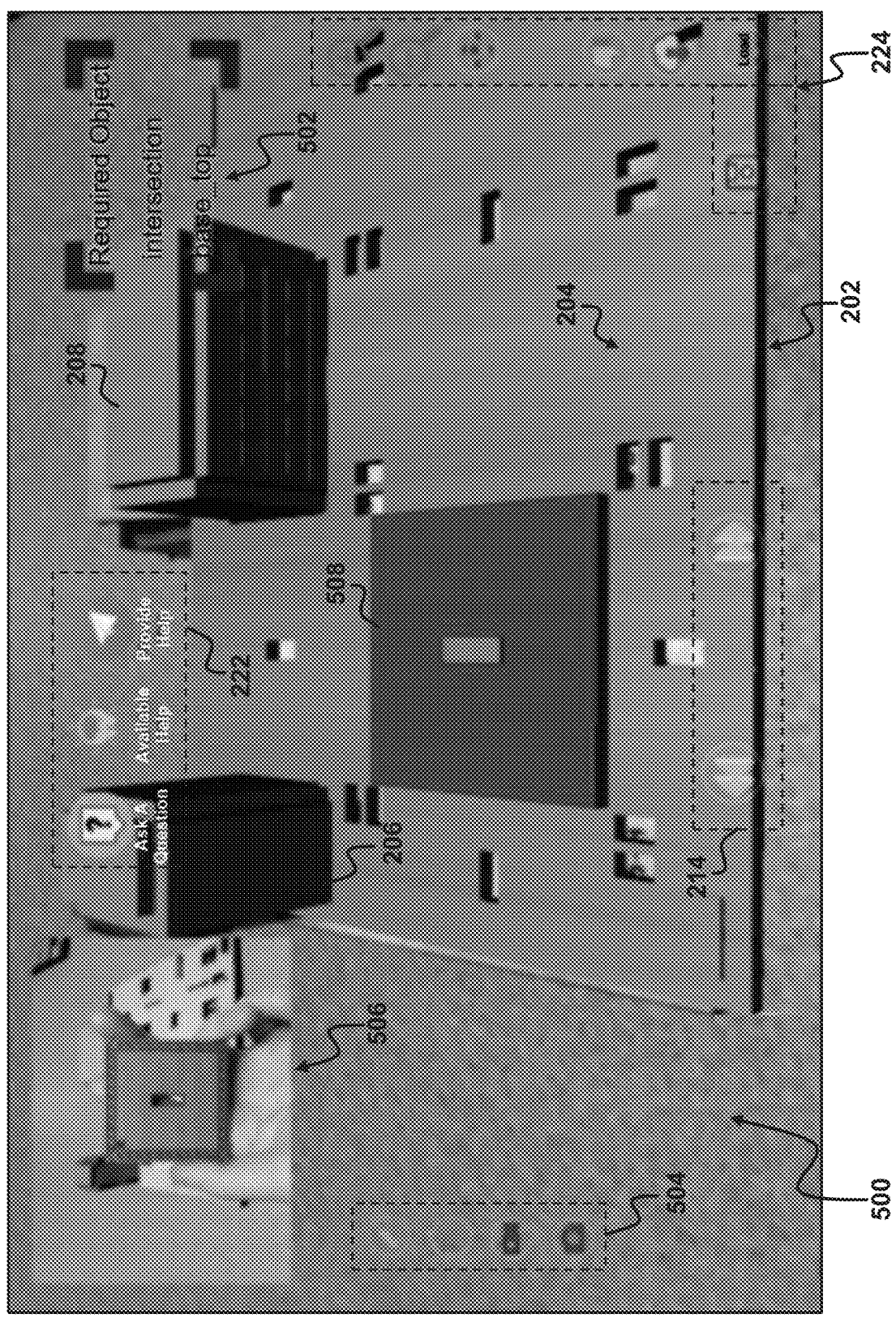
FIG. 7 shows a further graphical user interface for providing an augmented reality learning experience.

The graphical user interface rendered and displayed by the processor 22 may, for example, comprise a graphical user interface similar to the interactive graphical user interface 200 described above with respect to FIG. 4. Similarly, FIG. 7 shows a further graphical user interface 500 for providing an augmented reality learning experience. The graphical user interface 500 is essentially similar to interactive graphical user interface 200 and includes a plurality of graphical elements super imposed on real-time images and/or video of the real-world workspace 60. The interactive graphical user interface 500 similarly includes the three-dimensional models 202, 204, 206, and 208 arranged to show the expected state of progress of the miniature smart city as a result of the current step in the sequence of steps. Likewise, the interactive graphical user interface 500 similarly includes the virtual controls 214 for navigating the sequence of steps, the virtual controls 222 for collaborating with other students, and the virtual controls 224 for zooming in and out, downloading augmented reality project data, saving augmented reality content, rating augmented reality content, etc. Finally, the interactive graphical user interface 500 similarly includes a text annotation 502 (e.g., "Required Object intersection base top") providing instruction for the current step.

When a student 12 would like to move on to a next step or return to a previous step, the student can provide inputs via the virtual controls 214 of the graphical user interface 200, 500 to select a new step in the task being performed (such as the next step or the previous step). In response to receiving an input from the student 12 indicating a change of step via the virtual controls 214, the processor 22 reads from the augmented reality project data 38, 50 the information and multimedia AR content associated with a newly selected step of the task. Likewise, the processor 22 renders, and operates the display screen 28 to display, an updated graphical user interface including at least one graphical element of the augmented reality content that is associated with the newly selected step of the task.

With continued reference to FIG. 6, the method 400 continues with a step of generating, based on user inputs, a question regarding a particular step of the task (block 430). Particularly, in the event that a particular student 12 has a question regarding a particular step of the task, the student 12 can provide inputs via the graphical user interface to provide question data (such as by selecting the ask a question button (left) of the virtual controls 222). The processor 22 generates question data based on inputs received from the user via the graphical user interface. The question data may include any combination of data indicating a question from the student regarding a step of the task such as a text string entered via a virtual/physical keyboard by the student 12, an image captured by the camera 26, a video captured by the camera 26, and/or an audio file recorded by a microphone (not shown) of the augmented reality device 20A.

The method 400 continues with a step of uploading the question regarding the particular step of the task to the cloud server (block 440). Particularly, after receiving and/or generating the question data, the processor 22 operates the network communications module 30 to upload the question data to the cloud server 40. The processor 42 of the cloud server 40 operates the network communications module 48 to receive the question data and stores the question data in the memory 44 in association with the particular step of the task to which the question relates.

The method 400 continues with a step of downloading a question regarding a particular step of the task from the cloud server (block 450). Particularly, in the event that another student 12 is interested in answering questions of his or her fellow students, the student 12 can provide inputs via the graphical user interface to view questions from other students (such as by selecting the provide help button (right) of the virtual controls 222). In response to receiving a corresponding input from the student, the processor 22 of the augmented reality device 20A operates the network communications module 30 to request question data from the cloud server 40. In response to a request, the processor 42 of the cloud server 40 operates the network communications module 48 to transmit to the augmented reality device 20A any question data that has be received relating to augmented reality projected data 50. The processor 22 of the augmented reality device 20A operates the network communications module 30 to receive the question data from the cloud server 40 and stores it in the memory 24. The processor 22 operates the display screen 28 and/or a speaker to display or output the question data via the graphical user interface. As discussed above, the question data may take the form of text string, an image, a video, or an audio file. In this way, the student 12 can see what questions his or her classmates have with respect to various steps of the task being perform and may be inspired to provide help in the form of supplemental augmented reality content.

The method 400 continues with a step of generating, based on user inputs, supplemental augmented reality content associated with a particular step of the task (block 460). Particularly, in light of the questions of other students or upon his or her own volition, a student 12 can make contributions to the augmented reality project data 38, 50 by generating additional augmented reality content in association with a particular step of the task. In at least one embodiment, the graphical user interface includes virtual controls for generating additional augmented reality content which includes at least one additional graphical element associated with a particular step of the task. The processor 22 generates the additional augmented reality content based on inputs received from the user via the graphical user interface and/or data from the camera 26. The additional graphical elements may take the form of a text annotation entered via a virtual/physical keyboard by the student 12, a drawing annotation drawn by touching the display screen 28 or by controlling a mouse pointer to create virtual markings, an image captured by the camera 26, or a video captured by the camera 26.

In the example of FIG. 7, the graphical user interface 500 includes virtual controls 504 for providing additional augmented reality content. Particularly, the virtual controls 504 include a drawing button (top) that enables the student to create drawing annotation by touching the display screen 28 or by controlling a mouse pointer to create virtual markings, a text button (top-middle) that enables to student to create a text annotation by entering text via a virtual/physical keyboard, a video button (bottom-middle) that enables to student to capture a video with the camera 26, and an image button (bottom) that enables to student to capture an image with the camera 26. In the example shown, the student has captured an image 506 showing the correct physical component that corresponds to an intersection road segment 508 that is to be installed onto the upper base 202 during the current step of the task.

With continued reference to FIG. 6, the method 400 continues with a step of uploading the additional augmented reality content for the particular step of the task to the cloud server (block 470). Particularly, after generating the additional augmented reality content, the processor 22 operates the network communications module 30 to upload the additional augmented reality content to the cloud server 40. The processor 42 of the cloud server 40 operates the network communications module 48 to receive the additional augmented reality content and stores the additional augmented reality content in the memory 44 in association with the particular step of the task to which the additional augmented reality content relates.

The method 400 continues with a step of downloading additional augmented reality content for a particular step of the task from the cloud server (block 480). Particularly, in the event that another student 12 is interested in receiving help from of his or her fellow students, the student 12 can view available help from other students (such as by selecting the available help button (middle) of the virtual controls 222). In response to receiving a corresponding input from the student, the processor 22 of the augmented reality device 20A operates the network communications module 30 to request additional augmented reality content from the cloud server 40 that is associated with the current step of the task that is being performed by the student 12. In response to a request, the processor 42 of the cloud server 40 operates the network communications module 48 to transmit to the augmented reality device 20A any additional augmented reality content that has be received relating to the current step of the task that is being performed by the student 12. The processor 22 of the augmented reality device 20A operates the network communications module 30 to receive the additional augmented reality content from the cloud server 40 and stores it in the memory 24.

The method 400 continues with a step of displaying the additional augmented reality content in association with the particular step of the task in the user interface (block 490). Particularly, the processor 22 renders, and operates the display screen 28 to display, an updated graphical user interface including at least one graphical element of the additional augmented reality content that is associated with the current step of the task that is being performed by the student 12. In this way, the student 12 can view helpful additional augmented reality content that was generated by his or her classmates to receive help with a particular step of the task. In the example of FIG. 7, the graphical user interface 500 is updated to show the image 506 that was captured by another student to show the correct physical component that corresponds to an intersection road segment 508 that is to be installed onto the upper base 202 during the current step of the task.

Global Collaboration and Iterative Improvement Over Multiple Classroom Sessions

Figure 8:
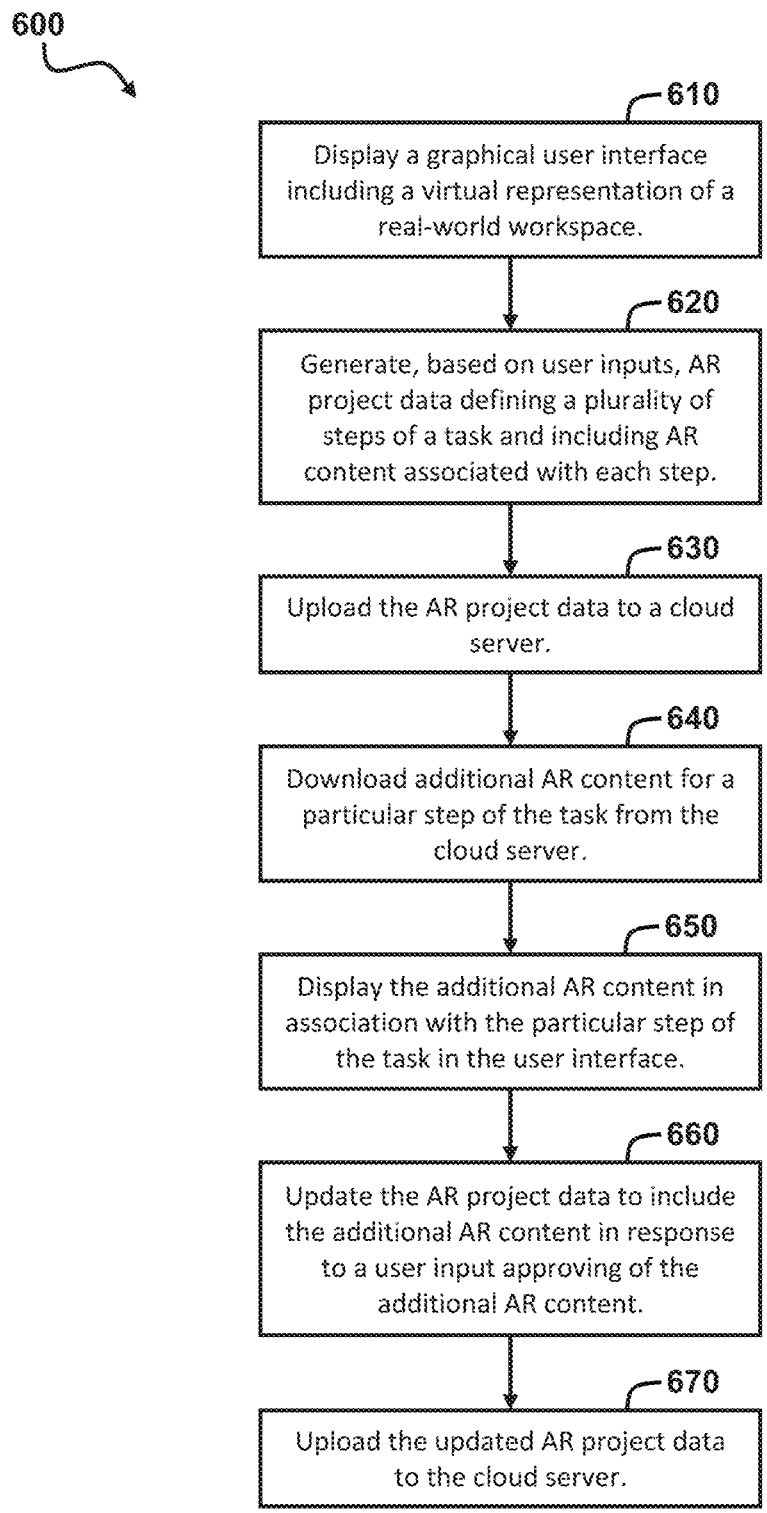
FIG. 8 shows a logical flow diagram for a method for global collaboration and iterative improvement of an augmented reality learning experience.

FIG. 8 shows a logical flow diagram for a method 600 for global collaboration and iterative improvement of an augmented reality learning experience. In the description of the method, statements that a method, process, processor, and/or system is performing some task or function refers to a controller or processor (e.g., the processor 22 of an augmented reality device 20B or the processor 42 of the cloud server 40) executing programmed instructions stored in non-transitory computer readable storage media (e.g., the memory 24 of a augmented reality device 20B or the memory 44 of the cloud server 40) operatively connected to the controller or processor to manipulate data or to operate one or more components in the augmented reality system 10 to perform the task or function. Additionally, the steps of the methods may be performed in any feasible chronological order, regardless of the order shown in the figures or the order in which the steps are described.

The method 600 embodies the global pull interaction modality of the augmented reality system 10. Global pull requests are approved by the instructor and sent by students. Once the changes are merged, they will take effect globally (i.e., to all the class). In some cases, students are only allowed to make a global pull request after they finish the project and these requests are handled by the instructor after class. The global pull interaction modality helps instructors improve the augmented reality learning experience which will benefit students from future class given a new iteration of the augmented reality project content.

The method 600 begins with a step of displaying a graphical user interface including a virtual representation of a real-world workspace (block 610). Particularly, the processor 22 of the augmented reality device 20B renders, and operates the display screen 28 to display, a graphical user interface including a virtual representation of a real-world workspace. The graphical user interface includes a digital canvas that provides a virtual space to place three-dimensional models representing components of the task to be performed, create animations illustrating steps of the task, and create other learning aids to assist the student in performing the task.

Figure 9:
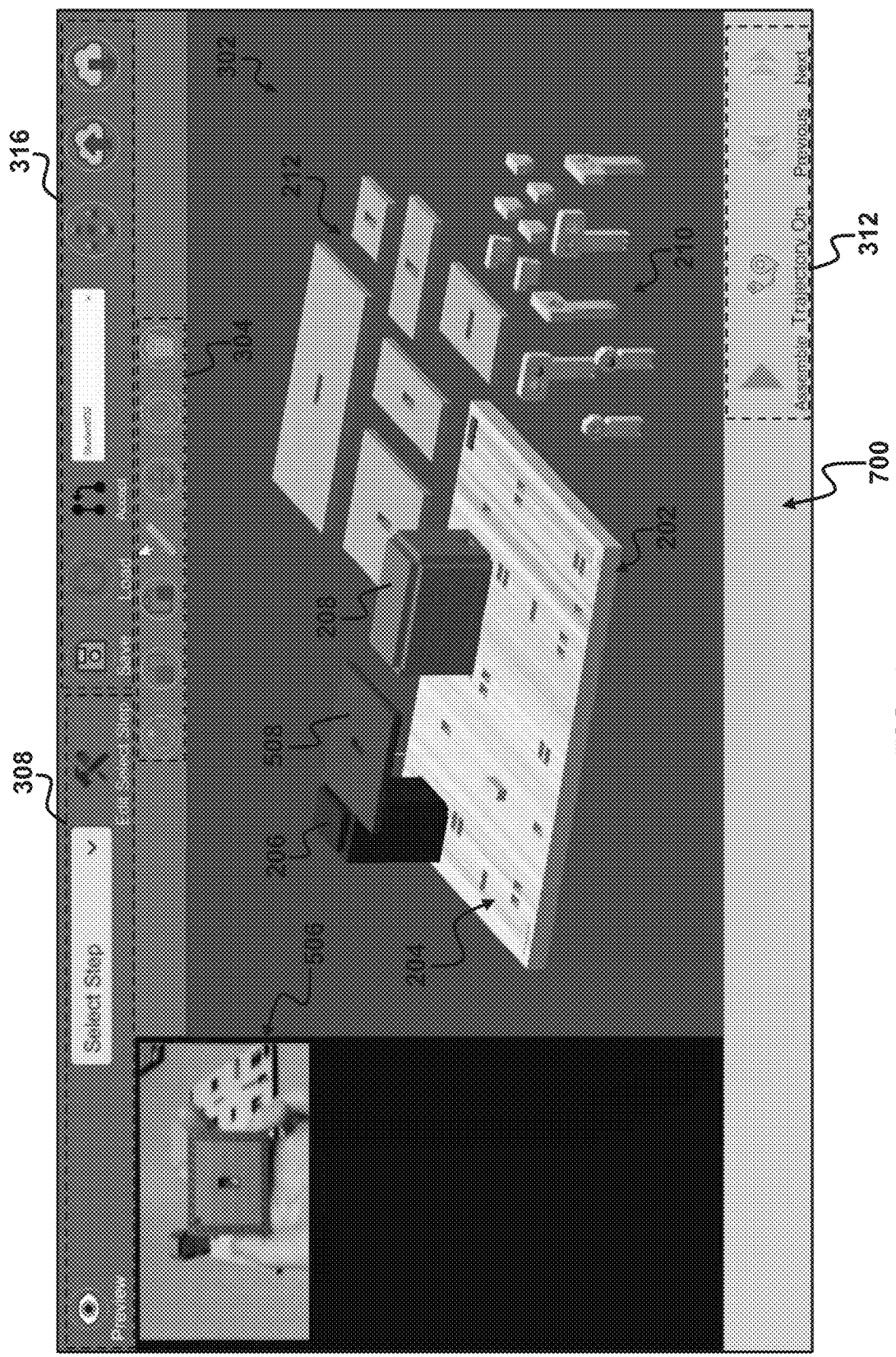
FIG. 9 shows a further graphical user interface for authoring augmented reality experiences.

The graphical user interface rendered and displayed by the processor 22 may, for example, comprise a graphical user interface similar to the interactive graphical user interface 300 described above with respect to FIG. 5. Similarly, FIG. 9 shows a further graphical user interface 700 for authoring augmented reality experiences. The graphical user interface 900 is essentially similar to interactive graphical user interface 300 and includes the digital canvas 302 comprises in which the instructor 16 places the three-dimensional models 202-212 of the real-world components that will be utilized to perform that task that is to be performed. The interactive graphical user interface 700 similarly includes the canvas tool bar 304 having virtual controls for manipulating the three-dimensional models 202-212, the task editing toolbar 308 having virtual controls for defining the sequence of steps that make up the task, the animation controls 312 for playing the animations, rewinding the animations, fast forwarding the animations, and hiding or showing the trajectory of the animation path, and the collaboration panel 316 for file management and for reviewing global pull requests The method 600 begins with a step of generating, based on user inputs, AR project data defining a plurality of steps of a task and including augmented reality content associated with each step (block 620). Particularly, the processor 22 of the augmented reality device 20B receives a plurality of inputs from the instructor 16 via the graphical user interface 300, 700, in the manners described above, to define the sequence of steps for the task and to generate augmented reality content associated with each step. The augmented reality content associated with each step at least includes an arrangement of the three-dimensional models that represents the expected state of progress of the task as a result of each particular step in the sequence of steps. Particularly, using the graphical user interface 300, 700, the instructor 16 provides user inputs to manipulate the three-dimensional models 202-212 using virtual buttons and drag-and-drop controls (e.g., via the canvas tool bar 304) to define the expected state of progress of the task for each step. The processor 22 receives the user inputs renders the graphical user interface 300, 700 according to the user inputs and, when instructor 16 is finished, stores the defined arrangement of the three-dimensional models 202-212 in the augmented reality project data 38 association with the particular step of the task.

Additionally, the augmented reality content associated with each step may include an animation illustrating what is to be done by the student at the particular step. In at least one embodiment, the animation includes a particular component moving towards another component to connect or engage with a target component. The processor 22 receives inputs via the graphical user interface 300, 700 to select a first three-dimensional model to be a moving part and a second three-dimensional model to be a target part. The processor 22 automatically generates an animation in which the first three-dimensional model moves along a path toward the second three-dimensional model. In response to instructor 16 can interacting with the animation controls 312, the processor 22 renders and displays an animated preview of the animation after it has been generated.

Additionally, the augmented reality content associated with each step may include learning aids and other augmented reality content that can be presented to the student in association with a particular step. Particularly, the instructor 16 interacts with the animation palette 314 create a variety of learning aids and other augmented reality content including drawing annotations in the form of virtual markings or virtual shapes that are superimposed in association with a particular step, highlighting in which a particular three-dimensional model to is highlighted in association with a particular step, a text annotation in the form of a text string that is provided in association with a particular step, an audio annotation that is provided in association with a particular step, a video that is provided in association with a particular step, or an image that is provided in association with a particular step.

The method 600 begins with a step of uploading the augmented reality project data to a cloud server (block 630). Particularly, after generating the augmented reality project data 38, the processor 22 operates the network communications module 30 to upload the augmented reality project data 38 to the cloud server 40. The processor 42 of the cloud server 40 operates the network communications module 48 to receive the augmented reality project data 38 and stores the augmented reality project data 38 in the memory 44 as augmented reality project data 50.

The method 600 begins with a step of downloading additional augmented reality content for a particular step of the task from the cloud server (block 640). Particularly, in the event that one or more students 12 have made contributions to the augmented reality project data 38, 50 by generating additional augmented reality content in association with particular steps of the task, the instructor 16 can review those contributions and, if appropriate, incorporate them into the augmented reality project data such that future classroom session can benefit from the additional augmented reality content. In response to receiving a corresponding input from the instructor 16, the processor 22 of the augmented reality device 20A operates the network communications module 30 to request any or all additional augmented reality content from the cloud server 40 that has been generated by one or more students 12 during previous classroom sessions utilizing the augmented reality project data 38, 50. In response to a request, the processor 42 of the cloud server 40 operates the network communications module 48 to transmit some or all additional augmented reality content that has been generated by one or more students 12 during previous classroom sessions to the augmented reality device 20B. The processor 22 of the augmented reality device 20A operates the network communications module 30 to receive the additional augmented reality content from the cloud server 40 and stores it in the memory 24.

The method 600 begins with a step of displaying the additional augmented reality content in association with the particular step of the task in the user interface (block 650). Particularly, the processor 22 renders, and operates the display screen 28 to display, an updated graphical user interface including at least one graphical element of the additional augmented reality content that was contributed by the students 12. In this way, the instructor 16 can review additional augmented reality content that was generated by his or her students 12 and consider if the additional augmented reality content should be incorporated into the augmented reality project data 38, 50 such that future classroom session can benefit from the additional augmented reality content. In the example of FIG. 9, the graphical user interface 700 is updated to show the image 506 that was captured by student to show the correct physical component that corresponds to an intersection road segment 508 that is to be installed onto the upper base 202 during a particular step of the task.

The method 600 begins with a step of updating the augmented reality project data to include the additional AR content in response to a user input approving of the additional augmented reality content (block 660). Particularly, if the instructor 16 would like to approve a particular piece of additional augmented reality content (e.g., the image 506) for incorporation into the augmented reality project data 38, 50, he or she can select an appropriate option of the collaboration panel 316 (e.g., the "Accept" virtual button in FIG. 9). In response to receiving an input via the graphical user interface 300, 700 approving of the additional augmented reality content, the processor 22 updates the augmented reality project data 38 to store the additional augmented reality content in association with the particular step of the task to which it relates.

The method 600 begins with a step of uploading the updated AR project data to the cloud server (block 670). Particularly, after updating the augmented reality project data 38, the processor 22 operates the network communications module 30 to upload the updated augmented reality project data 38 to the cloud server 40. The processor 42 of the cloud server 40 operates the network communications module 48 to receive the updated augmented reality project data 38 and stores the updated augmented reality project data 38 in the memory 44 as updated augmented reality project data 50. In this way, when students 12 download the augmented reality project data 50 for usage during future classroom sessions, the approved additional augmented reality content contributed by other students will be incorporated into the augmented reality learning experience. This advantageously enables iterative improvement of the augmented reality learning experience through collaborations between instructors and students.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for providing augmented reality content as a second user performs a task in a real-world workspace, the method comprising:
    downloading, with a processor, first augmented reality content from a remote server and storing, in a memory, the first augmented reality content, the first augmented reality content defining a plurality of steps of the task and including at least one first graphical element associated with each of the plurality of steps of the task, the first augmented reality content having been generated by a first user;
    displaying, on a display screen, a graphical user interface including, superimposed on images of the real-world workspace, the at least one first graphical element that is associated with a step of the plurality of steps that is currently being performed by the second user;
    generating, with the processor, second augmented reality content based on inputs received from the second user via the graphical user interface, the second augmented reality content including at least one second graphical element associated with a respective step of the plurality of steps; and
    uploading, with the processor, the second augmented reality content to the remote server,
    wherein, subject to an approval by the first user, the first augmented reality content stored at the remote server is updated to incorporate the at least one second graphical element associated with the respective step of the plurality of steps.

2. The method according to claim 1, the displaying further comprising:
    detecting a ground surface of the real-world workspace;
    detecting a marking on at least one real-world component in the real-world workspace; and
    overlaying the at least one first graphical element within the graphical user interface depending on the detected ground surface and the detected marking.

3. The method according to claim 1, wherein the at least one first graphical element is three-dimensional model of at least one corresponding real-world component, the overlaying further comprising:
    overlaying the three-dimensional model upon the at least one corresponding component in the real-world workspace.

4. The method according to claim 3, the overlaying further comprising:
    adjusting at least one of a size and a position of the three-dimensional model based on inputs received from the second user via the graphical user interface.

5. The method according to claim 1, the least one first graphical element associated with a respective step of the plurality of steps of the task including at least one of (i) a text annotation having a text string, (ii) a drawing annotation having virtual markings, (iii) an image, and (iv) a video, the displaying the graphical user interface further comprising:
    displaying, on the display screen, as the second user performs the respective step, the at least one of (i) the text annotation, (ii) a drawing annotation, (iii) the image, and (iv) the video, superimposed on the images of the real-world workspace.

6. The method according to claim 1 further comprising:
    downloading, with the processor, first question data from a remote server, the first question data including at least one of (i) a text string, (ii) an image, (iii) a video, and (iv) a virtual markings indicating a question from a third user and being associated with a respective step of the plurality of steps.

7. The method according to claim 6, wherein the second augmented reality content includes at least one graphical element associated with the respective step of the plurality of steps and indicates an answer to the question from the third user.

8. The method according to claim 1 further comprising:
    generating, with the processor, second question data based on inputs received from the second user via the graphical user interface, the second question data including at least one of (i) a text string, (ii) an image, (iii) a video, and (iv) a virtual markings indicating a question from the second user and being associated with a step of the plurality of steps; and
    uploading, with the processor, the second question data to a remote server.

9. The method according to claim 1, wherein, subject to an approval by the first user, the first augmented reality content stored at the remote server is updated to incorporate the at least one second graphical element associated with the respective step of the plurality of steps.

10. The method according to claim 1, wherein:
    the task is an assembly task in which the second user assembles a plurality of components in the real-world workspace;
    the first augmented reality content including a plurality of three-dimensional models that represent the plurality of components, the first augmented reality content including, for each respective step in the plurality of steps, a defined spatial arrangement of the plurality of three-dimensional models representing an expected state of progress of the assembly task at the respective step; and
    the graphical user interface includes the plurality of three-dimensional models visually arranged according to the defined spatial arrangement for the step of the plurality of steps that is currently being performed by the second user.

11. The method according to claim 10 further comprising:
    receiving, via the graphical user interface, user inputs from the second user that indicate a step of the plurality of steps that is currently being performed by the second user.

12. A method for generating augmented reality content to be provided during performance of a task in a real-world workspace, the method comprising:
    displaying, on a display screen, a graphical user interface including a virtual representation of the real-world workspace;
    generating, with a processor, first augmented reality content based on inputs received from a first user via the graphical user interface, the first augmented reality content defining a plurality of steps of the task and including at least one first graphical element associated with each of the plurality of steps of the task, the at least one first graphical element being defined by the first user via the inputs;
    uploading, with the processor, the first augmented reality content to a remote server;
    downloading, with the processor, second augmented reality content from the remote server, the second augmented reality content including at least one second graphical element associated with a respective step of the plurality of steps, the second augmented reality content having been generated by a second user;

displaying, on the display screen, the at least one second graphical element of the second augmented reality content;

updating, with the processor, the first augmented reality content to incorporate the at least one second graphical element associated with the respective step of the plurality of steps, in response to the first user input approving that the at least one second graphical element should be incorporated with the first augmented reality content; and uploading, with the processor, the updated first augmented reality content to the remote server.

13. The method according to claim 12, wherein the task is an assembly task in which the second user assembles a plurality of components in the real-world workspace, the generating the first augmented reality content further comprising:

receiving, with the processor, user inputs via the graphical user interface to, for each respective step in the plurality of steps, manipulate and define a spatial arrangement of a plurality of three-dimensional models of the plurality of components within the virtual representation of the real-world workspace so as to represent an expected state of progress of the assembly task at the respective step, wherein the first augmented reality content includes, for each step in the plurality of steps, the spatial arrangement of the three-dimensional models of the components within the virtual representation of the real-world workspace.

14. The method according to claim 13, the generating the first augmented reality content further comprising:

receiving, with the processor, user inputs via the graphical user interface to select a first three-dimensional model of the plurality of three-dimensional models and a second three-dimensional model of the plurality of three-dimensional models; and automatically generating, with the processor, a three-dimensional animation in which the first three-dimensional model moves along a path toward the second three-dimensional model, wherein the first augmented reality content includes the animation.

15. The method according to claim 14 further comprising:

displaying, on the display screen, an animated preview of the three-dimensional animation in response to a user input received via the graphical user interface.

16. The method according to claim 12, the generating the first augmented reality content further comprising:

generating, with the processor, based on inputs received from the first user via the graphical user interface, at least one of (i) a text annotation having a text string to be provided in association with a step of the plurality of steps and (ii) a drawing annotation having virtual markings to be superimposed on images of the real-world workspace in association with a step of the plurality of steps.

17. The method according to claim 12, the generating the first augmented reality content further comprising at least one of:

capturing, with a camera, at least one of (i) an image and (ii) a video that is to be provided in association with a step of the plurality of steps; and receiving, with the processor, user inputs via the graphical user interface, the user inputs selecting at least one of (i) an image and (ii) a video stored in a memory that is to be provided in association with a step of the plurality of steps.

18. The method according to claim 12 further comprising:

downloading, with the processor, second augmented reality content from the remote server, the second augmented reality content including at least one second graphical element associated with a respective step of the plurality of steps, the second augmented reality content having been generated by the second user; and displaying, on the display screen, the at least one second graphical element of the second augmented reality content.

19. The method according to claim 18 further comprising:

updating, with the processor, the first augmented reality content to incorporate the at least one second graphical element associated with the respective step of the plurality of steps, in response to the first user input approving that the at least one second graphical element should be incorporated with the first augmented reality content; and uploading, with the processor, the updated first augmented reality content to the remote server.

* * * * *